US012743695B2

(12) United States Patent
Wyper et al.

(10) Patent No.: US 12,743,695 B2
(45) Date of Patent: Sep. 22, 2026

(54) METHODS, SYSTEMS, AND DEVICES FOR MACHINE LEARNING-BASED CONTEXTUAL ENGAGEMENT DECISION ENGINE

(71) Applicant: FIDELITY INFORMATION SERVICES, LLC., Jacksonville, FL (US)

(72) Inventors: Stephane Wyper, Woodland Hills, CA (US); James Clayton, Sanborn, NY (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

(21) Appl. No.: 18/146,113

(22) Filed: Dec. 23, 2022

(65) Prior Publication Data

US 2023/0214837 A1 Jul. 6, 2023

Related U.S. Application Data

(60) Provisional application No. 63/296,305, filed on Jan. 4, 2022.

(51) Int. Cl.
*G06N 20/00* (2019.01)
*G06Q 20/38* (2012.01)
*G06Q 20/40* (2012.01)

(52) U.S. Cl.
CPC ......... *G06Q 20/4014* (2013.01); *G06N 20/00* (2019.01); *G06Q 20/389* (2013.01); *G06Q 20/4016* (2013.01)

(58) Field of Classification Search
CPC ............ G06Q 20/4014; G06Q 20/389; G06Q 20/4016; G06N 20/00; G06N 3/08; G06N 5/01
USPC ............................................................ 705/75
See application file for complete search history.

(56) References Cited

U.S. PATENT DOCUMENTS

2005/0080693 A1 4/2005 Foss, Jr. et al.
2014/0086177 A1* 3/2014 Adjakple .............. H04W 74/04 370/329
2015/0032847 A1 1/2015 van Coppenolle et al.
2016/0232600 A1* 8/2016 Purves ................. G06Q 20/351
2017/0278085 A1* 9/2017 Anderson .............. G06Q 20/12
2018/0121964 A1* 5/2018 Zhang ................ G06Q 30/0277
2018/0314971 A1* 11/2018 Chen .................. H04L 67/1008
2019/0251550 A1 8/2019 Tamari et al.

(Continued)

OTHER PUBLICATIONS

Notification of Transmittal of the International Search Report and the Written Opinion of the International Searching Authority dated Apr. 17, 2023 (8 pages).

*Primary Examiner* — Eduardo Castilho
*Assistant Examiner* — Karlyannie M. Garcia
(74) *Attorney, Agent, or Firm* — FINNEGAN, HENDERSON, FARABOW, GARRETT & DUNNER LLP

(57) ABSTRACT

A system for processing a transaction at a point of engagement comprising receiving an input interaction from a user, communicating with a plurality of identity providers to validate an identity of the user, communicating with a plurality of payment providers to collect available payment or funding options, mapping the input interaction to an output interaction, and performing a transaction that reflects the mapping of the input interaction to the output interaction.

13 Claims, 10 Drawing Sheets

(56) References Cited

U.S. PATENT DOCUMENTS

| | | | | |
|---|---|---|---|---|
| 2020/0265512 | A1* | 8/2020 | James | G06Q 40/03 |
| 2021/0383391 | A1 | 12/2021 | Barry et al. | |
| 2022/0303271 | A1* | 9/2022 | Elsherif | G06F 8/61 |

* cited by examiner

METHODS, SYSTEMS, AND DEVICES FOR MACHINE LEARNING-BASED CONTEXTUAL ENGAGEMENT DECISION ENGINE

CROSS-REFERENCE TO RELATED APPLICATIONS

The present application claims priority to U.S. Provisional Application 63/296,305 filed on Jan. 4, 2022, the contents of which are hereby incorporated herein by reference.

TECHNICAL FIELD

The present disclosure relates to identity and payment systems, ecosystems, platforms, and ways in which such systems may be enhanced via optimization and orchestration. In particular, the present disclosure relates to a contextual engagement decision engine that dynamically determines optimal digital identity and funding options for a given user interaction based on a number of variables.

BACKGROUND

Identity and payment methods, devices, systems, and ecosystems allow for users and/or consumers to make purchases and/or commercial decisions through various platforms, via a multitude of payments and proof of identity mechanisms, and from a plethora of funding sources.

The current consumer experience requires various points of engagement for purchasing, proofs of identity, payment mechanisms, and fundings sources that all need to interact with other during a purchasing transaction and/or process. For example, the point of engagement represents where customers make purchases and may be either a mobile app, a web browser, an in-store interaction, social media interaction, smart display interaction, or via a device connected to the Internet-of-Things. Moreover, the proof(s) of identity refers to the methods of authentication and may be done via authentication mechanisms and/or identity cards procured from a national government, local government, academic institution, and/or employer. Also, the payment mechanisms represent various methods of payment and may include credit/debit cards, digital wallets, wearable devices, mobile devices, QR codes, and/or biometric payments. Finally, the funding sources represent the funding sources for the purchases and may include a bank account, a line of credit, government benefits, cryptocurrency, loyalty points, and/or stored value.

The storing of such financial and identity data with multiple providers across multiple environments as explained above may prove cumbersome, complicated, slow, unintelligent, and liable to fraud. As such, there is a need to optimize and orchestrate among all the different providers and environments in a safe, intelligent, robust, and encapsulated manner.

Adding to this, there are currently fundamental shifts impacting methods of authentication, methods of payment, and sources of payments. Among these fundamental shifts is the utilization of the consumer as a token. Indeed, biometrics will replace card, mobile, and other devices to become the single secure way that consumers will be able to authenticate transactions across any point of interaction. Such a movement will mean that biometric profiles are poised to become the default identifier as consumers pivot away from other authentication mechanisms. Another fundamental shift is the movement towards a single trusted identity. Indeed, consumers are continuously consolidating the number of entities that hold their payments, identities, and preferences. There has been movement to even consolidate all such critical information to a single trusted government-approved provider. Such interest in a single trusted government-approved provider to encapsulate personal data has also grown due to increases in identity-related frauds and the need for compliance with various government regulations, including the Improving Digital Identity Act of 2021.

Another fundamental shift is an ever-evolving consumer optionality wherein consumers continue to expand the number of funding sources and payment mechanisms for an increasing number of providers. Moreover, there is a fundamental shift towards orchestration between such providers and environments wherein online merchants and platforms wish to orchestrate payment processes to manage rapid growth. As such, technology adoption is being written using packaged software and Application Programming Interfaces (APIs) that allow online merchants and platforms to rapidly assembly and configure differentiated solutions and multiple providers and environments to their consumers.

As mentioned above, these fundamental shifts allow for an ever-expanding optionality across all these providers and environments pertaining to the purchasing transaction and/or process. Moreover, all such providers and environments—including point(s) of engagement, identity proofs, payment mechanisms, and funding sources—are inextricably linked. However, despite this linkage, the various providers and environments do not communicate with one another to enhance the purchasing process—this lack of communication and interaction is palpable. Indeed, there exists a need to define, anticipate, and encapsulate linkages and correlations between the various providers and environments and their respective options provided for by the consumer.

For instance, where and when a consumer makes a purchase may represent a point of engagement of a purchasing transaction and/or process, a consumer's payment of the purchase via a certain credit card my represent a payment mechanism of the same purchase, and a consumer's use of a government ID to authorize the payment may represent a proof of identity of the same purchase. However, the point of engagement of the purchasing transaction and/or process is not necessarily linked to the payment mechanism and/or the proof of identity of the same purchasing transaction and/or process. There is a need for dynamic communication between each of the various environments, providers, and/or mechanisms and to glean from such communication benefits in the form of, for example, anticipated authentication mechanism(s) and/or other relevant correlations.

Furthermore, there is a need to define and anticipate which authentication mechanism should be linked to which funding source for each customer interaction. Likewise, there is a need to define and anticipate which payment mechanism should be linked to which funding source, proof of identity, or point of engagement. Moreover, there is a need to learn from and adapt such decisioning processes as customers interact across a wider number of touchpoints, channels, and devices. In an environment of such eclectic devices, payment mechanisms, funding sources, proofs of identities, and authentication mechanisms, gleaning, learning from, adapting to, anticipating, and otherwise generally correlating between all such elements of the purchasing process and/or transaction becomes essential.

Given this, there exists also an overwhelming need for a provider to abstract away the complexity of the integration of the above multiple providers and multiple environments on behalf of the system and/or ecosystem. Such a provider will need to centralize technical integration into a broad array of partners, payment methods, and payment endpoints to keep pace with ever expanding set of options and optionality. Moreover, such a provider will require a digital identity and payment system that is simple, intelligent, optimized, and orchestrated.

SUMMARY

Different from conventional solutions, the present disclosure solves the above problem by encapsulating a wide variety of points of engagement, identity providers, identity brokers, funding and payment sources, funding and payment mechanisms, and identity authentication mechanisms and devices under an orchestration layer wherein such an orchestration layer allows for the system to be omni-channel, agnostic of funding channels, intelligent and simple thereby enhancing the efficiency, effectiveness, robustness, and durability of the payment ecosystem.

Moreover, such an orchestration layer allows for the creation of a contextual engagement decision engine that ensures that the various providers and environments are in constant communication with each other and with each customer transaction and/or interaction. This way, the contextual engagement decision engine will allow for an intelligent way to automatically determine the appropriate form of authentication and funding source based on several data variables associated with a given customer transaction and/or interaction.

Such a contextual engagement decision engine and its respective orchestration layer achieves the above-mentioned benefits of enhancing the payment ecosystem by providing a single point of entry for digital identity and payment processing, optimization and orchestration, intelligence, and simplicity. The provision of a single point of entry for the contextual engagement decision engine or the digital identity and payment processing system is done through the use of a single API integration to access multiple identification and funding providers. Also, the contextual engagement decision engine provides for optimization and orchestration between all the various players in a commercial transaction by allowing for an orchestration layer that integrates previously discrete players in a fast, seamless, efficient, and effective manner.

Moreover, the contextual engagement decision engine provides for intelligence by ensuring that previous players, providers, and/or environments who were previously in different integrations to now bind together under the same orchestration layer. This allows for communication within the orchestration layer, including prepayment identity checks and smart payment routing. This further allows for the combination of solutions from multiple providers thereby offering a unique data set that leads to better decision making, smart payment routing which reduces failure rates and optimizes for cost and speed, and the combination with fraud signals from multiple providers which ensures robust defense.

To allow the contextual engagement decision engine to intelligently perform a transaction that connects an appropriate input interaction with an appropriate output interaction, the contextual engagement decision engine may gather the necessary data and inputs within the orchestration layer. Thereafter, the contextual engagement decision engine may undergo an intelligent decision process to arrive at the appropriate output interaction. Such a decision process may be hierarchical and may include the use of an initial predefined set of rules followed by dynamic statistical models to improve upon the decision, and a final analysis by machine learning models to further improve upon the decision and arrive at an optimal output. Moreover, the decision process may utilize historic consumer transaction data to train the machine learning models to provide the appropriate optimal output. Furthermore, the decision process may also utilize current and live consumer transaction data to continuously improve upon the machine learning models appropriately. Essentially, the contextual engagement decision engine may use a hierarchical decision process that allows for intelligent, data-driven orchestration of contextual funding and/or payment decision(s) to arrive at the appropriate decision and/or output interaction.

For example, to allow the contextual engagement decision engine to intelligently perform a transaction that connects the appropriate form of authentication and funding source based on several data variables associated with a given customer transaction and/or interaction, the contextual engagement decision engine may utilize the aforementioned communication within the orchestration layer to gather input(s) from various players, providers, and/or environments who were previously in different integrations. Such inputs may be as varied as prepayment identity checks, smart payment routing, the identity of the consumer, the payment, and/or the payment provider, among others. Thereafter, the contextual engagement decision engine may place the inputs through a decision process to arrive at an appropriate output interaction, wherein the output interaction may be the retrieval and establishment of an identity and a payment provider of the said transaction, an identity validation mechanism, a matched funding source, and/or a matched payment provider, among others. The decision process of the contextual engagement decision engine may be hierarchical, as the input may be sent through various stages and/or devices to intelligently arrive at the optimal output interaction. Such stages and/or devices may first be a predefined set of rules that may be defined as a preliminary set and/or collection of conditions that, if met, map the input interaction to a certain output interaction with a high level of confidence. After which, the input interaction may thereafter be sent to stages and/or devices that may be dynamic statistical models that embody and/or encompass statistical methods. Finally, the input interaction may be sent to stages and/or devices that may be machine learning models that further optimize the output interaction.

Furthermore, the contextual engagement decision engine provides for simplicity by having one integrated system to manage an identity and payment ecosystem. This allows for a single system to manage identity brokers and payment processing, the ability to choose the services a customer needs now, the flexibility to adapt to changing needs in the future, and the definition of payment routing rules and authentication response approval thresholds.

Such a contextual engagement decision engine and its respective orchestration layer is relevant and has benefits across the entire payment ecosystem. For example, the contextual engagement decision engine allows commerce application developers to expand consumer funding options for purchases that will be made with a given merchant by offering biometric based payments and ID verification at in-store point of sale and in mobile app purchases. Also, the contextual engagement decision engine allows government agencies to actively develop and integrate digital ID platforms. Moreover, the contextual engagement decision engine allows traditional banks to identity management platforms to authenticate users and transactions. Furthermore, the contextual engagement decision engine ensures that Fintech innovators have a provider for Know Your Customer (KYC) validation wherein KYC is a vital set of identity-verification best practices required for most fintech apps. Also, the contextual engagement decision engine aids healthcare providers by ensuring that healthcare providers have digital identity capabilities to comply with laws governing patient access to health records and by offering their patients the ability to pay for services from their bank account or in installments via By Now Pay Later (BNPL).

In one embodiment, a system includes a memory storing instructions, and a process configured to execute the instructions to perform operations comprising receiving an input interaction from a user, communicating with a plurality of identity providers to validate an identity of the user, communicating with a plurality of payment providers to collect available payment or funding options, mapping the input interaction to an output interaction, and performing a transaction that reflects the mapping of the input interaction to the output interaction.

In a further embodiment, the input interaction may be an incoming transaction event at a point of engagement. In still another embodiment, the output interaction may be an identity verification mechanism that is a biometric authentication mechanism or the output interaction may be a matched funding source or a payment provider.

In yet another embodiment, the mapping of the input interaction to the output interaction may be a pre-filter step.

In a further embodiment, there may be a plurality of first devices wherein each of the first devices comprises a dynamic statistical risk model wherein the first devices further optimize the output interaction. Each of the dynamic statistical risk models may interactively re-baseline or weigh the output interact at periodic intervals In a further embodiment, there may be a plurality of second devices wherein each of the second devices comprises a machine learning model wherein the second devices further optimize the output interaction. Each of the machine learning models may retrain at periodic intervals or retrain based on data or model drift to further optimize the output interaction.

In another embodiment, a method of processing a transaction at a point of engagement comprises receiving an input interaction from a user, communicating with a plurality of identity providers to validate an identity of the user, communicating with a plurality of payment providers to collect available payment or funding options, mapping the input interaction to an output interaction, and performing a transaction that reflects the mapping of the input interaction to the output interaction.

In a further embodiment, the input interaction may be an incoming transaction event at a point of engagement. In still another embodiment, the output interaction may be an identity verification mechanism that is a biometric authentication mechanism or the output interaction may be a matched funding source or a payment provider.

In yet another embodiment, the mapping of the input interaction to the output interaction may be a pre-filter step.

In a further embodiment, there may be a plurality of first devices wherein each of the first devices comprises a dynamic statistical risk model wherein the first devices further optimize the output interaction. Each of the dynamic statistical risk models may interactively re-baseline or weigh the output interact at periodic intervals In a further embodiment, there may be a plurality of second devices wherein each of the second devices comprises a machine learning model wherein the second devices further optimize the output interaction. Each of the machine learning models may retrain at periodic intervals or retrain based on data or model drift to further optimize the output interaction.

In another embodiment, a system for processing a transaction at a point of engagement comprises a plurality of identity providers, a plurality of payment providers, a plurality of first devices wherein each of the first devices comprises a dynamic statistical risk model, and a plurality of second devices wherein each of the second devices comprises a machine learning model, wherein when the transaction originates at the point of engagement, the system communicates with at least one of the identity providers to validate an identity of a consumer, wherein when the transaction originates at the point of engagement, the system communicates with at least one of the plurality of payment providers to collect a payment or provide a payment provider, wherein at least one of the plurality of first devices and at least one of the plurality of second devices processes the identity of the consumer, the payment, and the payment provider to retrieve and establish an identity and a payment provider for the transaction.

BRIEF DESCRIPTION OF DRAWING(S)

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the present invention.

Figure 7:
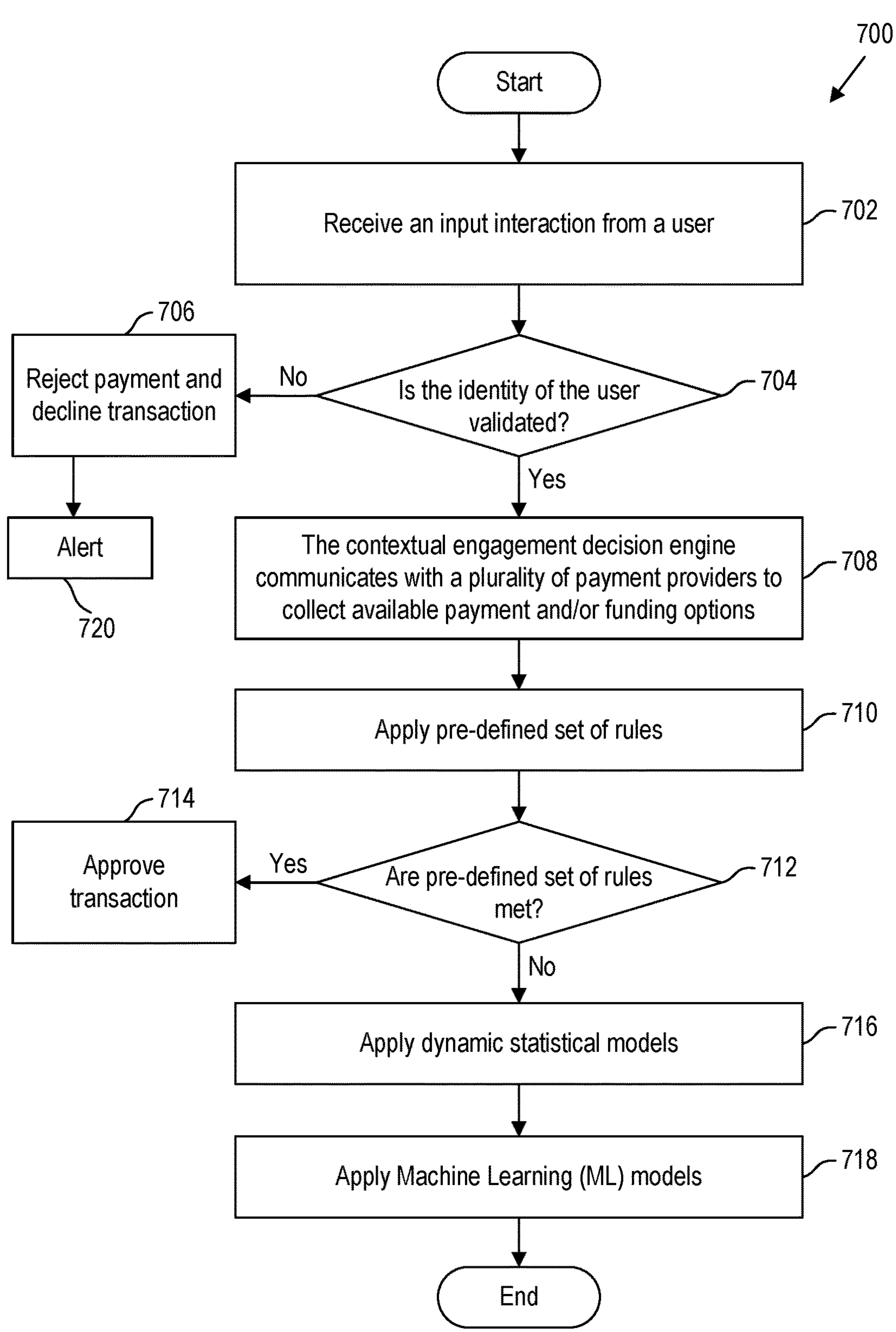

FIG. 7 illustrates a flowchart of an exemplary machine learning-based contextual engagement decision engine process including the receiving of input interaction(s) from a user and the outputting of certain output interaction(s) to the user(s), customer(s), and/or merchant(s) via the use of the contextual engagement decision engine, dynamic statistical models, and machine learning models, consistent with disclosed embodiments.

Figure 8:
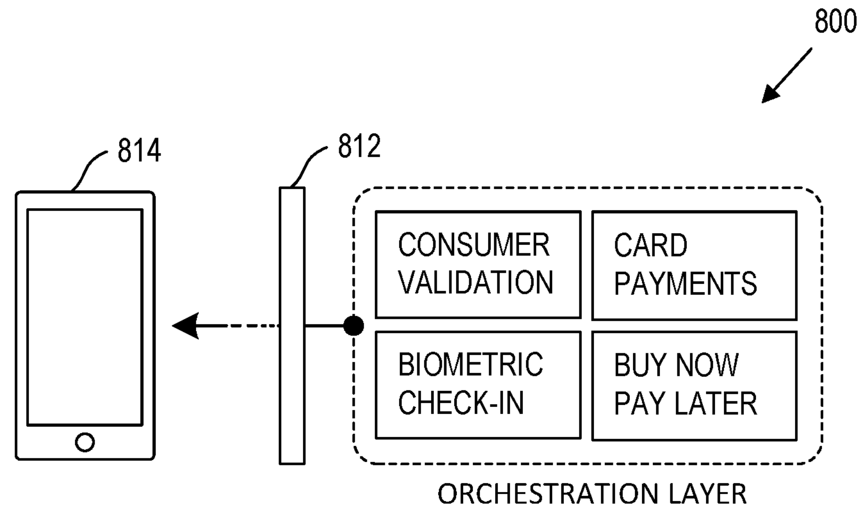

FIG. 8 illustrates an exemplary retail use case for the exemplary machine learning-based contextual engagement decision engine system, consistent with disclosed embodiments.

Figure 9:
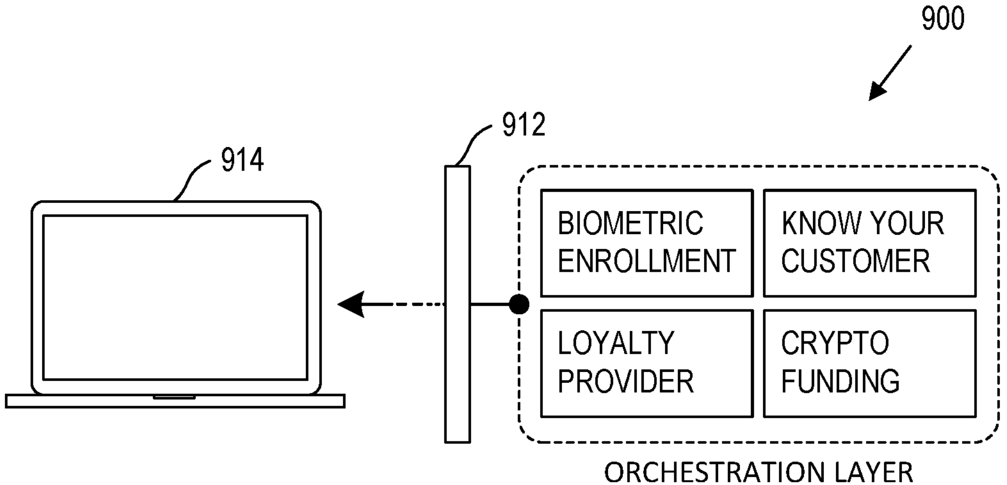

FIG. 9 illustrates an exemplary sports betting use case for the exemplary machine learning-based contextual engagement decision engine system, consistent with disclosed embodiments.

Figure 10:
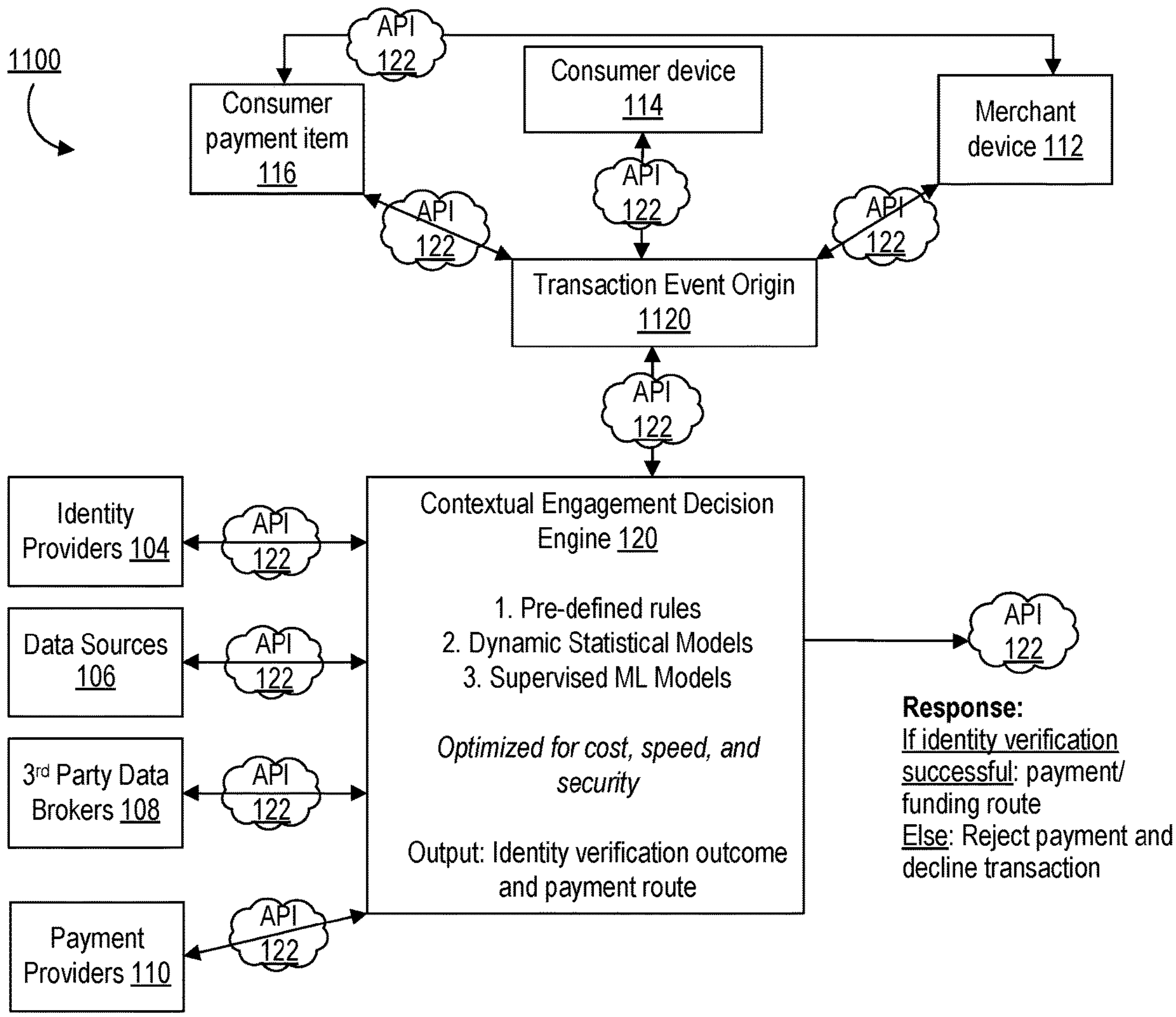

FIG. 10 illustrates a block diagram of an exemplary machine learning-based contextual engagement decision engine system, consistent with disclosed embodiments.

DETAILED DESCRIPTION

Reference will now be made in detail to exemplary embodiments, shown in the accompanying drawings.

Figure 1:
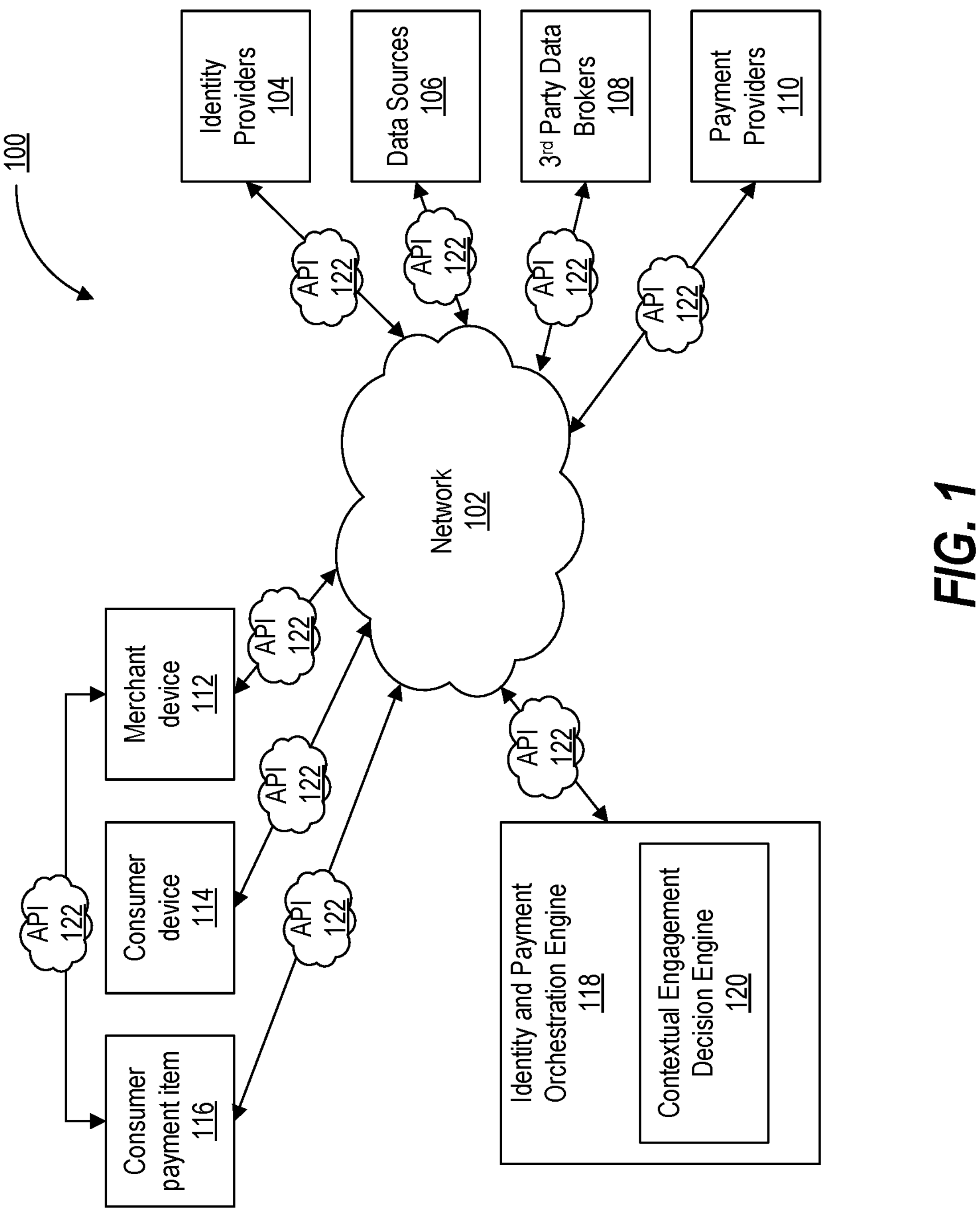
FIG. 1 illustrates a block diagram of an exemplary machine learning-based contextual engagement decision engine system, consistent with disclosed embodiments.

FIG. 1 illustrates a block diagram of an exemplary machine learning-based contextual engagement decision engine system 100, consistent with disclosed embodiments. System 100 may be configured for performing one or more payment transaction processes for a user(s) and/or a customer(s) at various point(s) of engagement consistent with disclosed embodiments.

As shown in FIG. 1, system 100 may include a network 102, an identity provider 104, data sources 106, 3$^{rd}$ party data brokers 108, payment providers 110, a merchant device 112, a consumer device 114, a consumer payment item 116, an identity and payment orchestration engine 118, a contextual engagement decision engine 120, and an application programming interface (API) 122, all of which may be communicatively coupled by a network 102. In some embodiments, the system 100 may comprise one or more of each of the components depicted in FIG. 1. Moreover, the components and arrangements of the components included in system 100 may vary. Thus, system 100 may include other components that perform or assist in the performance of one or more processes consistent with the disclosed embodiments.

In some embodiments, the network 102 may be any type of network that provides communication, exchanges information, and/or facilitates the exchange of information between components of the system 100. For example, in some embodiments, network 102 may comprise a wired or wireless network. In still other embodiments, network 102 may be the internet, intranet, a Wide Area Network (WAN), a Storage Area Network (SAN), a Metropolitan Area Network (MAN), Near Field Communication (NFC), optical code scanner, and/or any other suitable connection(s) configured to communicate data and enable the sending and receiving of information between the devices and components of the system 100. Moreover, the network 102 may utilize an application program interface (API) 122 to communicate between the devices and components of the system 100.

In some embodiments, the identity provider 104 may be implemented as one or more computer systems having at least one processor and at least one memory. The identify provider 104 may also utilize the at least one processor and at least one memory to process and store data systems, wherein such data systems may be configured to store data, receive data, provide data, communicate data, and/or process data. The identity provider 104 may communicate such data with the components and/or devices of the system 100. In some embodiments, the identity provider 104 may utilize an application program interface (API) 122 to communicate data with the components and/or devices of the system 100. In some embodiments, such data may include sensitive, confidential, and/or high risk data. In still other embodiments, such data may include sensitive, confidential, and/or high risk data pertaining to the identities of user(s) and/or individual(s) utilizing the system 100. In still other embodiments, such data may include personal identifiable information (PII) for an individual(s) wherein such personal identifiable information (PII) may include biometric identifiers, facial identifiers, financial information, bank account information, vehicle and/or license information, address information, medical and/or healthcare information, geographic information, phone/fax/mobile information, and other relevant identity information.

In some embodiments, data sources 106 may be implemented as one or more computer systems having at least one processor and at least one memory. In some embodiments, data sources 106 may be implemented as data centers, data farms, and/or server farms. In still other embodiments, data sources 106 may be implemented as data farms that analyze, process, grow, and enrich the relevant data. In other embodiments, the data sources 106 may be data systems, wherein such data systems may be configured to store data, receive data, provide data, communicate data, and/or process data. In still other embodiments, the data sources 106 may include sensitive, confidential, and/or high risk data pertaining to the identify of a user(s), market data, customer data, industry data, demographic data, technographic data, and/or operational data, amongst others. In some embodiments, the data sources 106 may utilize an application program interface (API) 122 to communicate data with the components and/or devices of the system 100, as need be.

In some embodiments, 3$^{rd}$ party data brokers 108 may be implemented as one or more computer systems having at least one processor and at least one memory. In some embodiments, the 3$^{rd}$ party data brokers 108 may be computer systems that receive, collect, store, service, analyze, communicate, and/or process data. In still other embodiments, the 3$^{rd}$ party brokers 108 may be data centers, data farms, and/or server farms that receive, collect, store, service, analyze, communicate, and/or process data. In still other embodiments, the 3$^{rd}$ party brokers 108 may receive, collect, store, service, analyze, communicate, and/or process data wherein such data may include sensitive, confidential, and/or high risk data pertaining to the identify of a user(s), market data, customer data, industry data, demographic data, technographic data, and/or operational data, amongst others. In some embodiments, 3$^{rd}$ party data brokers 108 may utilize an application program interface (API) 122 to communicate data with the components and/or devices of the system 100, as need be.

In some embodiments, payment providers 110 may be implemented as one or more computer systems having at least one processor and at least one memory. In some embodiments, the payment provider 110 may utilize a memory to store financial data and utilize a processor to collect, store, analyze, decipher, communicate, and/or process such data. In some embodiments, payment providers 110 may utilize an application program interface (API) 122 to communicate such data with the components and/or devices of the system 100, as need be. In still other embodiments, the payment provider 110 may be any financial service provider that provides payment. In some embodiments, the payment provider 110 may administer, manage, store, or otherwise maintain data relating to a line of credit, a checking account, a credit card account, a business account, a brokerage account, a cryptocurrency account, and/or any another financial account that may be associated with a user(s), individual(s), organization(s), and/or business. In some embodiments, the payment provider 110 may utilize an application program interface (API) 122 to communicate account data with the components and/or devices of the system 100, as need be.

In some embodiments, the merchant device 112 may be implemented as one or more computer systems having at least one processor and at least one memory. In some embodiments, the merchant device 112 may be implemented as a device. In some embodiments, the merchant device 112 may be any device(s) used to conduct transaction(s) for a merchant. Such transaction(s) may include financial transactions, identity verification transactions, operational transactions, and/or inventory transactions, among others. In some embodiments, the merchant device 112 may be any point of sale (POS) or point of purchase (POP) device used to conduct transaction(s) between a merchant and a user(s) or individual(s). In such embodiments, the merchant device 112 may be utilized by a user(s) and/or individual(s) who wishes to conduct a business and/or financial transaction(s) with the merchant. Such a merchant device 112 may perform an identification verification of the user(s) and/or individual(s) by communicating with any of the other component(s) and/or devices(s) before conducting the business and/or financial transaction. In some embodiments, the merchant device 112 may utilize an application program interface (API) 122 to communicate account data with the components and/or devices of the system 100, as need be.

In some embodiments, the consumer device 114 may be implemented as one or more computer systems having at least one processor and at least one memory. In some embodiments, the consumer device 114 may be implemented as a device. In some embodiments, the consumer device 114 may be any device(s) used to conduct transaction(s) for a consumer. Such transaction(s) may include financial transactions, identity verification transactions, operational transactions, and/or inventory transactions, among others. In some embodiments, the consumer device 114 may be a smartphone, a tablet, a laptop, a computer, and/or any device(s) connected to the network 102 that is able to conduct a transaction(s). In some embodiments, the consumer device 114 may utilize an application program interface (API) 122 to communicate data with the components and/or devices of the system 100, as need be.

In some embodiments, the consumer payment item 116 may be implemented as one or more computer systems having at least one processor and at least one memory. In some embodiments, the consumer payment item 116 may be implemented as a device. In some embodiments, the consumer payment item 116 may be any device(s) used to conduct payment transaction(s) for a consumer. In some embodiments, the consumer payment item 116 may be a smartphone capable of conducting a transaction for a consumer. In still other embodiments, the consumer payment item 116 may be a tablet, a laptop, a computer, and/or any device(s) connected to the network 102 that is able to conduct a transaction(s). In some embodiments, the consumer payment item 116 may be an identity verification mechanism that verifies the identity of the user(s) and or consumer(s) and conducts a transaction(s). In some embodiments, the consumer payment item 116 may be a biomimetic identification mechanism that verifies the identity of the user(s) and/or consumer(s) and conduct a transaction(s). In some embodiments, the consumer payment item 116 may be a credit card, a debit card, and/or any other card capable of carrying out transaction(s) for the user(s) and/or consumer(s). Such transaction(s) may include financial transactions, identity verification transactions, operational transactions, and/or inventory transactions, among others. In some embodiments, the consumer payment item 116 may utilize an application program interface (API) 122 to communicate data with the components and/or devices of the system 100, as need be.

In some embodiments, identity and payment orchestration engine 118 may be one or more computing devices configured to perform operations consistent with maintaining a plurality of decision engines through, for example, a contextual engagement decision engine 120. The identity and payment orchestration engine 118 may communicate with and receive data from, via the network 102, all other components of the system 100. Moreover, various APIs 122 may be utilized to ensure this facile communication between the identity and payment orchestration engine 118 and all other components of the system 100 in such a manner as to ensure an optimized payment process for the user(s), consumer(s), and/or merchant(s).

In some embodiments, the application programming interface 122 may be implemented as one or more computer systems having at least one processor and at least one memory. In some embodiments, the application programming interface 122 may be a device. In some embodiments, the application programming interface 122 may be software implemented on a device. In still other embodiments, the application programming interface 122 may connect all the components and devices of the system 100. In some embodiments, the application programming interface 122 may allow for the sharing of data between each of the components and devices of the system 100. Each of the connecting arrows between the various component(s) and/or device(s) in FIG. 1 may each comprise its own application programming interface 122 that allows for such communication. In other embodiments, there may be an overarching common application interface 122 that connects the various component(s) and/or device(s) of the system 100 together.

Moreover, system 100 brings all components together such that an orchestration layer exists between all such components of the system 100 wherein the user(s), consumer(s), and/or merchant(s) may interact via, for example, a consumer device 114 and/or a consumer payment item 116 as a single point of engagement with the system 100. Such an orchestration layer may be a software-based layer that lives in a centralized cloud environment which one or more components of system 100 connect to. Such an orchestration layer may also facilitate user onboarding, user profile maintenance, data sharing between components of system 100, and/or data analytics of data shared between components of system 100, as described herein. When user(s), customer(s), and/or merchant(s) initiates a transaction at a point(s) of engagement, this is considered an input interaction. Thereafter, the system 100 communicates with one or all of its respective components to allow the user(s), consumer(s), and/or merchant(s) to receive an output interaction accordingly. Indeed, the system 100 may communicate with either one or a combination of the identity providers 104, data sources 106, the 3$^{rd}$ party data brokers 108, payment providers 110, merchant device 112, consumer device 114, and/or the consumer payment item 116. As to the output interaction, it may be a matched funding source, a matched payment provider 110, and/or a matched identify verification mechanism. Moreover, there exists an orchestration layer in that the system 100 will encapsulate the identity providers 104, data sources 106, 3$^{rd}$ party data brokers 108, payment providers 110, the merchant device 112, the consumer device 114, and/or the consumer payment item 116 and communicate such findings with the user(s), consumer(s), and/or merchant(s) via a holistic output interaction accordingly. In this way, the user(s), consumer(s), and/or merchant(s) does not have to interact with each of the aforementioned components of the system 100 individually; rather, the user(s), consumer(s), and/or merchant(s) may make use of the aforementioned components of the system 100 in only a single transaction to ensure an appropriate output interaction.

Furthermore, such a transaction at a point(s) of engagement that is considered an input interaction may be a plethora of payment processing transactions including an incoming transaction event in the form of an e-commerce purchase transaction, an incoming purchase from a merchant device 112, and/or an incoming purchase from the customer(s) and/or user(s). Moreover, the point(s) of engagement may also differ and vary. The point(s) of engagement may be made via a consumer device 114 wherein such a consumer device 114 may be a smartphone, tablet, laptop, or desktop computer or via a purchase made by a consumer payment item 116 at a merchant device 112, among other incoming transaction events.

As to the contextual engagement decision engine 120, it is noted that such an engine 120 may further comprise computing devices configured to perform operations consistent with the contextual engagement decision engine system 100. Further detail as to these operations may be seen in FIG. 2 and FIG. 3.

Figure 2:
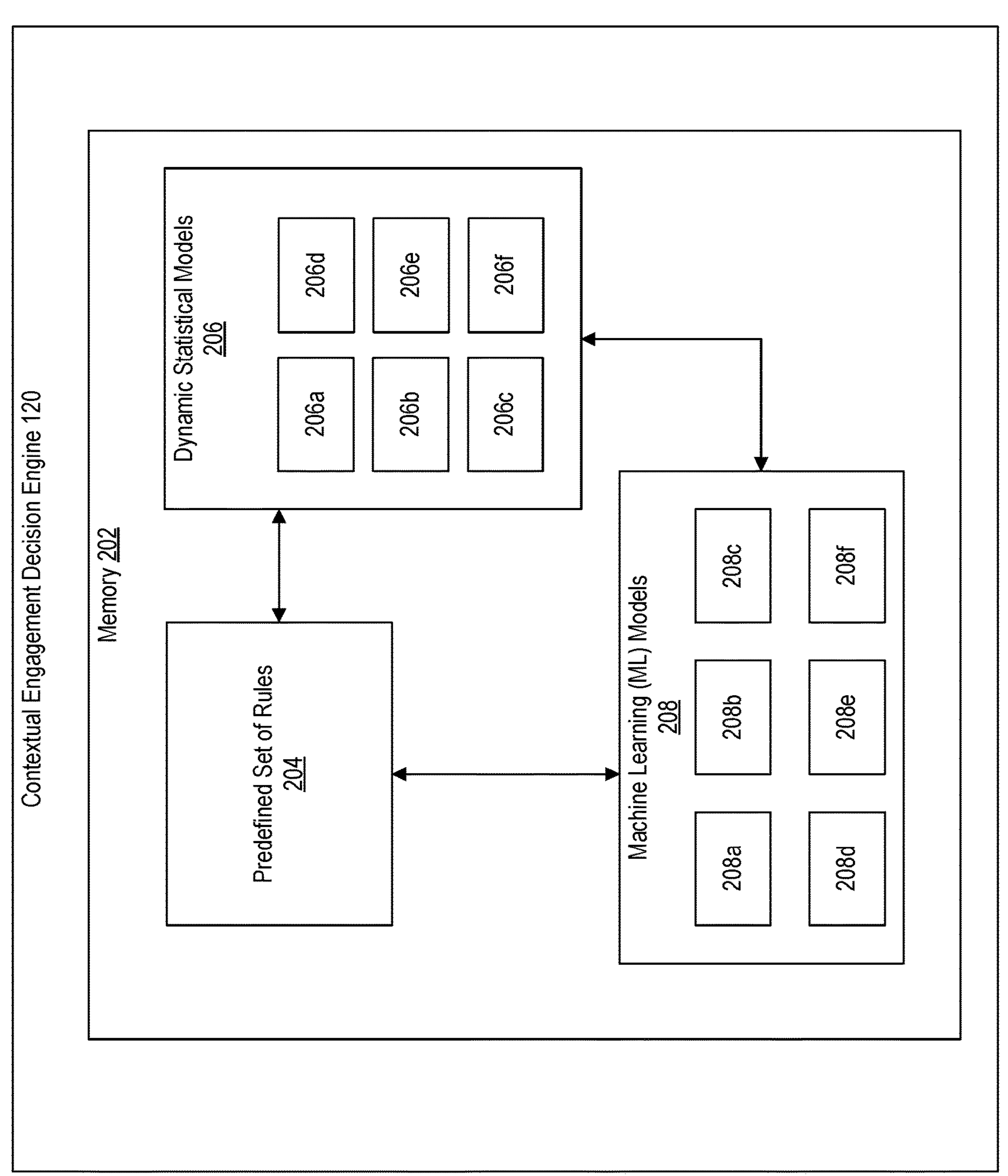
FIG. 2 illustrates a block diagram of a portion of an exemplary identity and payment orchestration engine, consistent with disclosed embodiments.

FIG. 2 is a block diagram of an exemplary contextual engagement decision engine 120, consistent with disclosed embodiments. As shown, the contextual engagement decision engine 120 may include several components, including a memory 202, a predefined set of rules 204, dynamic statistical models 206 that further comprise a plurality of first devices 206*a-f* wherein each of the plurality of first devices 206*a-f* comprises a dynamic statistical model, and Machine Learning (ML) models 208 that further comprise a plurality of second devices 208*a-f* wherein each of the plurality of second devices 208*a-f* comprises a Machine Learning (ML) model.

Once a user(s), customer(s), and/or merchant(s) initiates an incoming transaction event at a point(s) of engagement as an input interaction, the input interaction may be sent to the predefined set of rules 204, the dynamic statistical models 206, and/or the Machine Learning (ML) models 208. Note that FIG. 2 does not specify a specific order through which the input data passes through each of the elements at which stage in the process.

In some embodiments, the memory 202 may be one or more storage devices such as a flash drive, a hard disk drive, a solid state drive, a database, a data center, a random access memory (RAM), a read only memory (ROM), and/or any other relevant type of data storage system. The memory 202 may include one or more programs, data, and/or instructions wherein such programs, data, and/or instructions store operations to perform functions related to disclosed embodiments. In some embodiments, the memory 202 may process a transaction initiated by a user(s), customer(s), and/or merchant(s) at a point(s) of engagement. Moreover, the memory 202 may process such operations by communicating with, via the network 102 and/or the API 122, all the components of the system 100 accordingly. Generally, the contextual engagement decision engine 120 receives an input interaction and, depending on certain factors, mechanization(s), and/or calculation(s), maps such an input interaction to an output interaction.

In some embodiments, the predefined set of rules 204 may be implemented on one or more computer systems having at least one processor and at least one memory. In some embodiments, the predefined set of rules 204 may be implemented on a device. In some embodiments, the predefined set of rules 204 may be implemented on a device(s) used to process an input interaction. In some embodiments, such an input interaction may be an incoming transaction event at a point(s) of engagement. In some embodiments, the predefined set of rules 204 may be implemented on a device(s) comprising a collection of conditions that, if met by the input interaction, provides very high confidence to map the input interaction to a specific output interaction. Such an output interaction may be an identity verification mechanism and, in some embodiments, a biometric authentication mechanism that may utilize hand palms, fingerprints, and/or eye retinas, amongst other biometrics to authenticate the transaction. In some embodiments, such an output interaction of a biometric authentication mechanism means that the user(s), consumer(s), and/or merchant(s) will require a biometric authentication to process further in the transaction, based on the provided input interaction. Alternatively, an output interaction may be a matched funding source (a specific checking account, credit card, debit card, line of credit, etc.) or a payment provider (bank, credit union, institution, etc.). Such an output interaction of either a matched funding source or a payment provider means that the user(s) and/or merchant(s) may access a specific matched funding source, or a specific payment provider based on the input interaction.

In some embodiments, the dynamic statistical models 206 may be implemented on one or more computer systems having at least one processor and at least one memory. In some embodiments, the dynamic statistical models 206 may be implemented on a device. In some embodiments, the dynamic statistical models 206 may be implemented on a device(s) used to process an input interaction. In some embodiments, such an input interaction may be an incoming transaction event at a point(s) of engagement. In some embodiments, the dynamic statistical models 206 may be a plurality of first devices 206*a-f* wherein each of the plurality of first devices 206*a-f* comprises a dynamic statistical model. Each of the first devices 206*a-f* may receive the input interaction. Moreover, each of the dynamic statistical models may be iteratively re-baselined and/or weighted at periodic intervals to further optimize the output interaction. The application of the dynamic statistical models 206 to the output from the predefined set of rules, or from any output, will provide further accuracy and optimization to the output interaction.

Moreover, the architecture of the dynamic statistical models 206 may vary depending on the input and/or input features received via the API 122 from any of the components 104-116 of the system 100. Such architecture of the dynamic statistical models 206 may be logistic regression-based architecture. In logistic regression-based architecture, a statistical method models the probability of a contextual decision taking place by having the logarithmic odds for the decision be a combination of one or more independent variables, wherein the independent variables may be input(s) from any one of and/or a combination of components 104-116 of the system 100. Thereafter, logistic regression estimates the parameters of such a logistic model, to optimize for the best contextual decision, given the aforementioned input variables.

Alternatively, such architecture of the dynamic statistical models 206 may be tree-based architecture. In tree-based architecture, a statistical method utilizes a tree/branch-inspired model of decisions and their possible outcomes, including likelihood of decision outcome(s). Thereafter, input data collected from any one of and/or a combination of components 104-116 of the system 100 is further subdivided in a tree into conditional decision(s) and/or setting(s) to make the actual contextual decision by benefitting from aforementioned conditional decision(s) and/or setting(s).

In other embodiments, dynamic statistical models 206 may be architected in a different manner.

In some embodiments, the machine learning models 208 may be implemented on one or more computer systems having at least one processor and at least one memory. In some embodiments, the machine learning models 208 may be implemented on a device. In some embodiments, the machine learning models 208 may be implemented on a device(s) used to process an input interaction. In some embodiments, such an input interaction may be an incoming transaction event at a point(s) of engagement. In some embodiments, the machine learning models 208 may be a plurality of second devices 208*a-f* wherein each of the plurality of second devices 208*a-f* comprises a Machine Learning (ML) model. Each of the second devices 208*a-f* may receive the input interaction and produce the required output interaction. Moreover, each of the Machine Learning (ML) models may be supervised classification and/or regression models that may be retrained at the entity and individual level to further optimize the output interaction. To further ensure the accuracy and effectiveness of the Machine Learning (ML) models, automated re-training of such Machine Learning (ML) models may be either done periodically or based on data and/or model drift. Indeed, the application of the Machine Learning (ML) models to the output from the predefined set of rules, or from any output, will provide further accuracy and optimization to the output interaction. In some embodiments, the machine learning models 208 may be low-complexity logistic regressors, over probabilistic models, higher-dimensional model frameworks such as random forest, extreme gradient boosting, or deep neural network models.

In still other embodiments, the architecture of one or more of machine learning models 208 may vary depending on the input and/or input features received via the API 122 from any of the components 104-116 of the system 100. As such, depending on the nature of inputs and context, the contextual engagement decision engine 120 applies the appropriate architecture of machine learning models 208. In some embodiments, however, the overall architecture of the machine models 208 may be divided into a preprocessing stage and a feature engineering stage.

In the preprocessing stage, the machine learning models 208 prepare and enhance the available input data and/or input features received via the API 122 from any of the components 104-116 of the system 100. Specifically, the preprocessing stage may comprise a process of null values imputation, aggregation by context and/or context aggregation, and outlier removal in historical training data. During null values imputation, the machine learning models 208 remove the null values (values and/or data that are unknown or missing) from the data. During the aggregation by context and/or context aggregation, the machine learning models 208 aggregate and/or clump certain input data and/or input features according to some aggregation principle wherein the aggregation principle may be an aggregate function and/or merely context aggregation. Such context may be, for example, payment type, user and/or consumer address, type of data source, etc. During the outlier removal in historical training data, it is noted that historical training data, in this context, may be the historical customer data utilized to train the machine learning models 208. During the outlier removal in historical training data, the machine learning models 208 may remove outlier data present in such historical training data.

In the feature engineering stage, the machine learning models 208 leverage the preprocessed and enhanced data from the aforementioned preprocessing stage to create new variable(s) and/or feature(s) not in the historical training set, to extract necessary analysis from such new variable(s) and/or feature(s), to transform such new variable(s) and/or feature(s) into other features if need be, and to further enhance the machine learning models 208 through the analysis and use of such new variable(s) and/or feature(s). Specifically, the feature engineering stage may comprise the creation of context-specific features, timeseries and/or slot tagging, removal of dummy variables, and categorical class encoding. During the creation of context-specific features, the machine learning models 208 create regional-specific, merchant-specific, and/or retail-specific features such as payment amounts, frequently used payment channels, frequently used consumer devices, etc. Thereafter, during time series and/or slot tagging, the machine learning models 208 timestamp in certain intervals both the relevant input data and/or input features received via the API 122 from any of the components 104-116 of the system 100 and the newly-created features accordingly. The machine learning models 208 may do so by sequencing the data points indexed together in time order. Moreover, the intervals of the time-stamps may be context-specific and may be as small or large as need be. Such time series and/or slot tagging of data may aid in predicting current and future trend(s). Thereafter, during the removal of dummy variables, the machine learning models 208 remove the feature(s) and/or variables that do not contribute to the predictive decision-making process of the machine learning models 208. Finally, during the categorical class encoding stage, the machine learning models 208 may convert the relevant data into integer format so that the data may be aid in improving the machine learning models 208.

In still other embodiments, the machine learning models 208 and the second devices 208*a-f* may ingest baseline input data or a training set from the identity providers 104, the data sources 106, the 3rd party data brokers 108, the payment providers 110, the merchant devices 112, the consumer devices 114, the consumer payment items 116, and fraud prevention tool(s), amongst others. In some embodiments, the machine learning models 208 and the second devices 208*a-f* may ingest live interaction data from the identity providers 104, the data sources 106, the 3rd party data brokers 108, the payment providers 110, the merchant devices 112, the consumer devices 114, the consumer payment items 116, and fraud prevention tool(s), amongst others. Such live interaction data may be data obtained by inference based on consumer(s) and/or user(s) interaction type, frequency, location, channel, and/or time of day. Such live interaction data may be able to further hone the machine learning models 208 and the second devices 208*a-f* accordingly.

Moreover, this live interaction data may be historical consumer transactions with broad timeframes and/or live consumer transactions. The machine learning models 208 may ingest both the historical consumer/user transactions and the live consumer/user transactions accordingly. The machine learning models 208 may ingest the historical consumer/user transactions to initially create and/or make up the models. The machine learning models 208 may ingest the live consumer/user transactions to further enhance the model by, for example, personalizing the model parameters for the specific consumer/user funding, payment, identification, and/or general consumer behavior. Thus, the machine learning models 208 continuously utilize live consumer/user transactions to update and retrain the models accordingly. Thus, the machine learning models 208 retrain continuously through both the initial baseline input data (the historical consumer/user transactions) and its training via the live consumer/user transactions. Doing so will feed the machine learning models 208 to ensure their continued accuracy and effectiveness. This continuous honing ensures that the machine learning models 208 will output a highly optimized and effective output interaction. Furthermore, the machine learning models' 208 ingestion of live interaction data may be controlled dynamically on an individual consumer/user bases to optimize predictive performance of the machine learning models 208 and/or to ensure individual fitting of the machine learning models 208. As such, the consumer/user may actively control, change, and/or modify the amount of data input(s) and/or feature(s) of the live interaction data that the machine learning models 208 ingest. Indeed, the application of the machine learning models 208 to the output from the predefined set of rules, or from any output, will provide further accuracy and optimization to the output interaction. Moreover, this output interaction may be customized for the user(s), customer(s), and/or merchant(s) to balance risk appetite and convenience.

Figure 3:
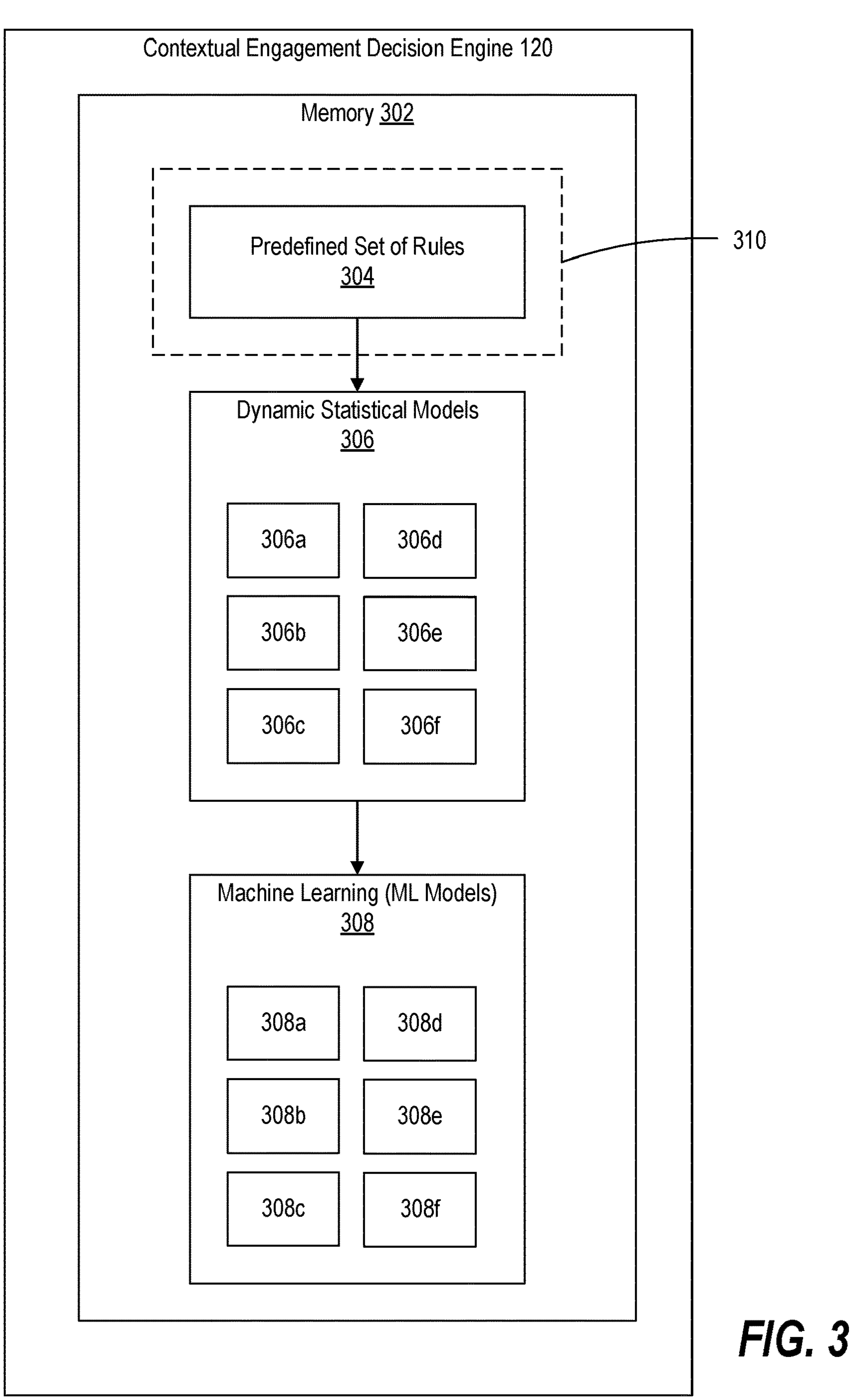
FIG. 3 illustrates a block diagram of a portion of an exemplary identity and payment orchestration engine, consistent with disclosed embodiments.

FIG. 3 is a block diagram of an exemplary identity and payment orchestration engine 120, consistent with disclosed embodiments. As shown, the contextual engagement decision engine 120 may include several components, including a memory 302, a predefined set of rules 304, dynamic statistical models 306 that further comprise a plurality of first devices 306*a-f* wherein each of the plurality of first devices 306*a-f* comprises a dynamic statistical model, and Machine Learning (ML) models that further comprise a plurality of second devices 308*a-f* wherein each of the plurality of second devices 308*a-f* comprises a Machine Learning (ML) model.

Once a user(s), customer(s), and/or merchant(s) initiates an incoming transaction event at a point(s) of engagement as an input interaction, the input interaction may be sent to the predefined set of rules 304, the dynamic statistical models 306, and/or the Machine Learning (ML) models 308. Note that, in some embodiments as in FIG. 3, the input interaction may first be inputted into the predefined set of rules 304 as a pre-filter step 310 prior to being further honed by the dynamic statistical models 306 and the Machine Learning (ML) models 308.

In some embodiments, the memory 302 may be one or more storage devices such as a flash drive, a hard disk drive, a solid state drive, a database, a data center, a random access memory (RAM), a read only memory (ROM), and/or any other relevant type of data storage system. The memory 302 may include one or more programs, data, and/or instructions wherein such programs, data, and/or instructions store operations to perform functions related to disclosed embodiments. In some embodiments, the memory 302 may process a transaction initiated by a user(s), customer(s), and/or merchant(s) at a point(s) of engagement. Moreover, the memory 302 may process such operations by communicating with, via the network 102 and/or the API 122, all the components of the system 100 accordingly. Generally, the contextual engagement decision engine 120 receives an input interaction and, depending on certain factors, mechanization(s), and/or calculation(s), maps such an input interaction to an output interaction.

In some embodiments, the predefined set of rules 304 may be implemented on one or more computer systems having at least one processor and at least one memory. In some embodiments, the predefined set of rules 304 may be implemented on a device. In some embodiments, the predefined set of rules 304 may be implemented on a device(s) used to process an input interaction. In some embodiments, such an input interaction may be an incoming transaction event at a point(s) of engagement. In some embodiments, as seen in FIG. 3, the predefined set of rules 304 may be a device(s) comprising a collection of conditions that, if met by the input interaction, provide very high confidence to map the input interaction to a specific output interaction. Such an output interaction may be an identity verification mechanism and specifically a biometric authentication mechanism that may utilize hand palms, fingerprints, and/or eye retinas, amongst other biometrics to authenticate the transaction. Specifically, such an output interaction of a biometric authentication mechanism means that the user(s), consumer(s), and/or merchant(s) will require a biometric authentication to process further in the transaction, based on the provided input interaction. Alternatively, an output interaction may be a matched funding source (a specific checking account, credit card, debit card, line of credit, etc.) or a payment provider (bank, credit union, institution, etc.). Such an output interaction of either a matched funding source or a payment provider means that the user(s) and/or merchant(s) may access a specific matched funding source, or a specific payment provider based on the input interaction and/or input data.

In some embodiments, the dynamic statistical models 306 may be implemented as one or more computer systems having at least one processor and at least one memory. In some embodiments, the dynamic statistical models 306 may be implemented as a device. In some embodiments, the dynamic statistical models 306 may be a device(s) used to process an input interaction. In some embodiments, such an input interaction may be an incoming transaction event at a point(s) of engagement. In some embodiments, the dynamic statistical models 306 may be a plurality of first devices 306*a-f* wherein each of the plurality of first devices 306*a-f* comprises a dynamic statistical model. Each of the first devices 306*a-f* may receive the input interaction. Moreover, each of the dynamic statistical models may be iteratively re-baselined and/or weighted at periodic intervals to further optimize the output interaction. The application of the dynamic statistical models to the output from the predefined set of rules, or from any output, will provide further accuracy and optimization to the output interaction.

In some embodiments, the machine learning models 308 and the second devices 308*a-f* may ingest baseline input data or a training set from the identity providers 104, the data sources 106, the 3$^{rd}$ party data brokers 108, the payment providers 110, the merchant devices 112, the consumer devices 114, the consumer payment items 116, and fraud prevention tool(s), amongst others. In some embodiments, the machine learning models 308 and the second devices 308*a-f* may ingest live interaction data from the identity providers 104, the data sources 106, the 3$^{rd}$ party data brokers 108, the payment providers 110, the merchant devices 112, the consumer devices 114, the consumer payment items 116, and fraud prevention tool(s), amongst others. Such live interaction data may be data obtained by inference based on consumer(s) and/or user(s) interaction type, frequency, location, channel, and/or time of day. Such live interaction data may be able to further hone the machine learning models 308 and the second devices 308*a-f* accordingly. Thus, the machine learning models 308 retrain continuously through both the initial baseline input data and its training via the live interaction data. Doing so will feed the machine learning models 308 to ensure their continued accuracy and effectiveness. This continuous honing ensures that the machine learning models 308 will output a highly optimized and effective output interaction. Indeed, the application of the machine learning models 308 to the output from the predefined set of rules, or from any output, will provide further accuracy and optimization to the output interaction. Moreover, this output interaction may be customized for the user(s), customer(s), and/or merchant(s) to balance risk appetite and convenience.

Figure 4:
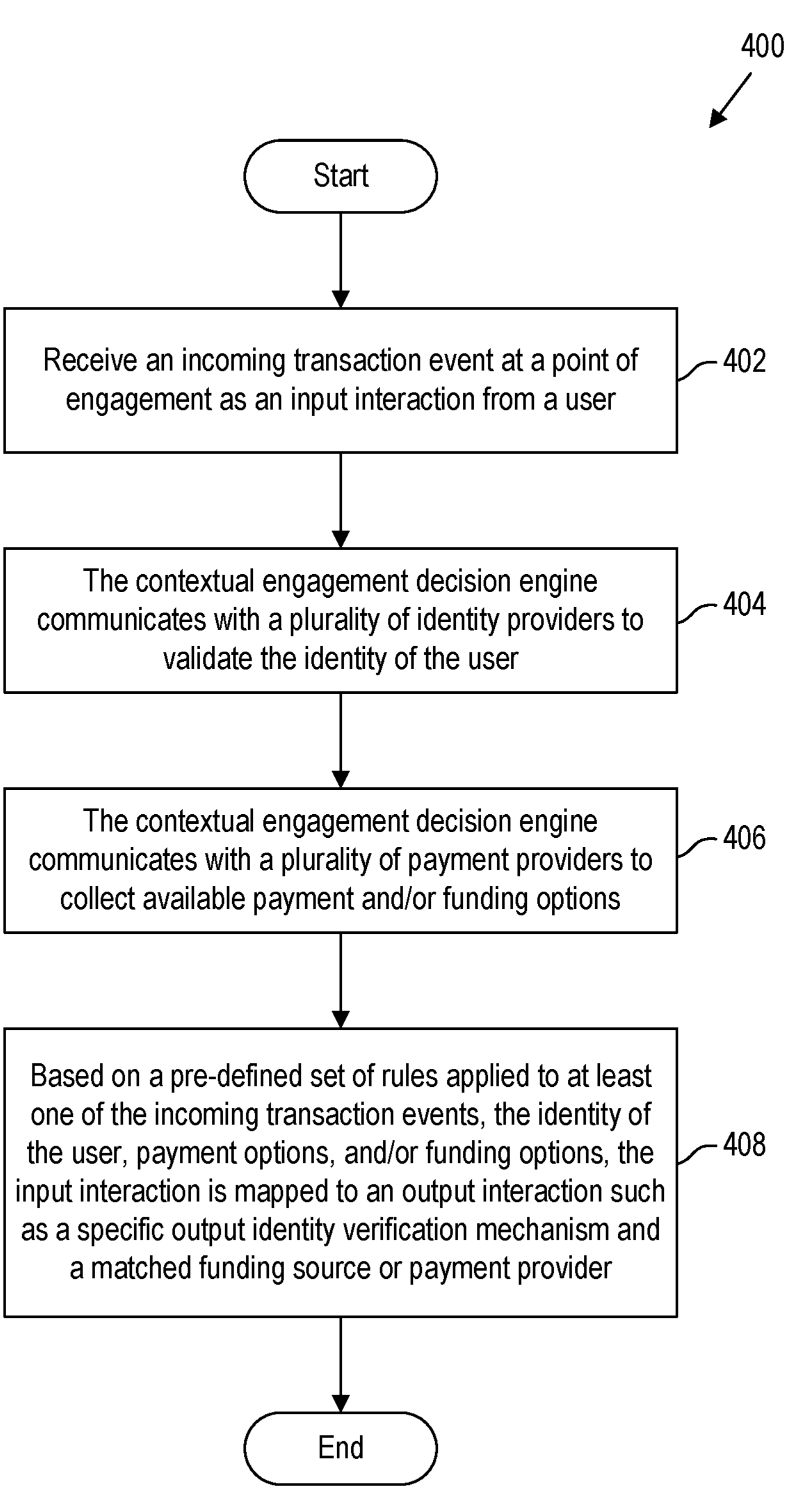
FIG. 4 illustrates a flowchart of an exemplary machine learning-based contextual engagement decision engine process, consistent with disclosed embodiments.

As noted above, the incoming input interaction and/or input data may be received from a user(s), customer(s), and/or merchant(s) via any of the components of system 100. Thereafter, this input interaction may be inputted, analyzed, honed, and/or optimized by the contextual engagement decision engine 120 of the identity and payment orchestration engine 118 to output a certain output interaction to the user(s), customer(s), and/or merchant(s) via any of the components of system 100. FIG. 4 is a flowchart of such an exemplary machine learning-based contextual engagement decision engine process 400, consistent with disclosed embodiments.

The machine learning-based contextual engagement decision engine process 400 may be implemented by one or more computer systems having at least one processor and at least one memory. In some embodiments, the machine learning-based contextual engagement decision engine process 400 may be implemented on a device. In some embodiments, the machine learning-based contextual engagement decision engine process 400 may be implemented by the machine learning-based contextual engagement decision engine system 100. The machine learning-based contextual engagement decision engine process 400 includes, at block 402, receiving an incoming transaction event(s) at a point(s) of engagement as an input interaction from a user(s), customer(s), and/or merchant(s). As mentioned above and seen in FIG. 1, such a transaction at a point(s) of engagement that may be considered an input interaction may be a plethora of payment processing transactions including an incoming transaction event in the form of an e-commerce purchase transaction, an incoming purchase from a merchant device 112, and/or an incoming purchase from the customer(s) and/or user(s). Moreover, the point(s) of engagement may also differ and vary. The point(s) of engagement may be made via a consumer device 114 wherein such a consumer device 114 may be a smartphone, tablet, laptop, or desktop computer or via a purchase made by a consumer payment item 116 at a merchant device 112, among other incoming transaction events.

Machine learning-based contextual engagement decision engine process 400 may further include, at block 404, having the contextual engagement decision engine 120 communicate with the identity provider 104 to validate the identity of the user. In some embodiments, the contextual engagement decision engine 120 may utilize an application programming interface (API) 122 to communicate information and/or data with the identity provider 104. Such data may be freely exchanged between the contextual engagement decision engine 120 and the identity provider 104. Moreover, such data may be continuously honed, analyzed, packaged, and/or modified be either the contextual engagement decision engine 120 and/or the identity provider 104 respectively. Furthermore, such data may include sensitive, confidential, and/or high risk data pertaining to the identities of user(s) and/or individual(s) utilizing the system 100. In still other embodiments, such data may include personal identifiable information (PII) for an individual(s) wherein such personal identifiable information (PII) may include biometric identifiers, facial identifiers, financial information, bank account information, vehicle and/or license information, address information, medical and/or healthcare information, geographic information, phone/fax/mobile information, and other relevant identity information.

Machine learning-based contextual engagement decision engine process 400 may further include, at block 406, having the contextual engagement decision engine 120 communicate with data sources 106, $3^{rd}$ party data brokers 108, and/or payment providers 110 to collect available payment and/or funding options.

Machine learning-based contextual engagement decision engine process 400 may further include, at block 408, applying a pre-defined set of rules and/or conditions on at least one of the incoming transaction events, the identity of the user, payment options, and/or funding options such that the input interaction is mapped to an output interaction wherein the output interaction may be a specific output identity verification mechanism and a matched funding source or payment provider. To do so, the contextual engagement decision engine 120 communicates with one or more device(s) in system 100 shown in FIG. 1 to collect available payment options, funding options, relevant identity information.

Figure 5:
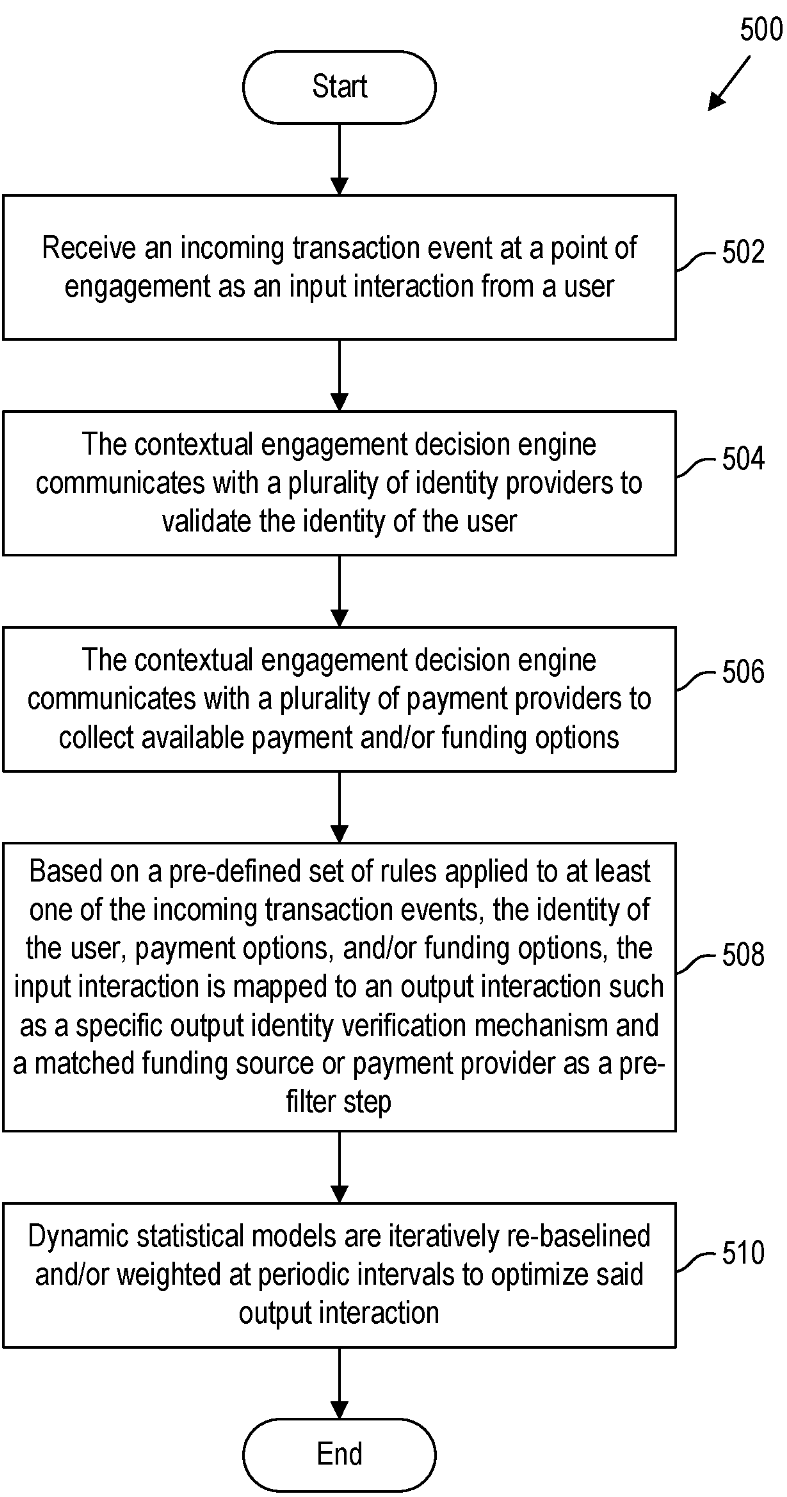
FIG. 5 illustrates a flowchart of an exemplary machine learning-based contextual engagement decision engine process including the use of dynamic statistical models, consistent with disclosed embodiments.

As noted above, the incoming input interaction and/or input data may be received from a user(s), customer(s), and/or merchant(s) via any of the components of system 100. Thereafter, this input interaction may be inputted, analyzed, honed, and/or optimized by the contextual engagement decision engine 120 of the identity and payment orchestration engine 118 to output a certain output interaction to the user(s), customer(s), and/or merchant(s) via any of the components of system 100. FIG. 5 is a flowchart of such an exemplary machine learning-based contextual engagement decision engine process 500, consistent with disclosed embodiments.

The machine learning-based contextual engagement decision engine process 500 may be implemented by one or more computer systems having at least one processor and at least one memory. In some embodiments, the machine learning-based contextual engagement decision engine process 500 may be implemented on a device. In some embodiments, the machine learning-based contextual engagement decision engine process 500 may be implemented by the machine learning-based contextual engagement decision engine system 100. The machine learning-based contextual engagement decision engine process 500 may include, at block 502, receiving an incoming transaction event(s) at a point(s) of engagement as an input interaction from a user(s), customer(s), and/or merchant(s). As mentioned above and seen in FIG. 1, such a transaction at a point(s) of engagement that is considered an input interaction may be a plethora of payment processing transactions including an incoming transaction event in the form of an e-commerce purchase transaction, an incoming purchase from a merchant device 112, and/or an incoming purchase from the customer(s) and/or user(s). Moreover, the point(s) of engagement may also differ and vary. The point(s) of engagement may be made via a consumer device 114 wherein such a consumer device 114 may be a smartphone, tablet, laptop, or desktop computer or via a purchase made by a consumer payment item 116 at a merchant device 112, among other incoming transaction events.

Machine learning-based contextual engagement decision engine process 500 may further include, at block 504, having the contextual engagement decision engine 120 communicate with a plurality of identity providers 104 to validate the identity of the user. In some embodiments, the contextual engagement decision engine 120 may utilize an application programming interface (API) 122 to communicate information and/or data with the identity provider 104. Such data may be freely exchanged between the contextual engagement decision engine 120 and the identity provider 104. Moreover, such data may be continuously honed, analyzed, packaged, and/or modified be either the contextual engagement decision engine 120 and/or the identity provider 104 respectively. Furthermore, such data may include sensitive, confidential, and/or high risk data pertaining to the identities of user(s) and/or individual(s) utilizing the system 100. In still other embodiments, such data may include personal identifiable information (PII) for an individual(s) wherein such personal identifiable information (PII) may include biometric identifiers, facial identifiers, financial information, bank account information, vehicle and/or license information, address information, medical and/or healthcare information, geographic information, phone/fax/mobile information, and other relevant identity information.

Machine learning-based contextual engagement decision engine process 500 may further include, at block 506, having the contextual engagement decision engine 120 communicate with data sources 106, 3$^{rd}$ party data brokers 108, and/or payment providers 110 to collect available payment and/or funding options.

Machine learning-based contextual engagement decision engine process 500 may further include, at block 508, applying a pre-defined set of rules and/or conditions on at least one of the incoming transaction events, the identity of the user, payment options, and/or funding options such that the input interaction is mapped to an output interaction wherein the output interaction may be a specific output identity verification mechanism and a matched funding source or payment provider, as a pre-filter step. To do so, the contextual engagement decision engine 120 communicates with one or more device(s) in system 100 shown in FIG. 1 to collect available payment options, funding options, relevant identity information. If the contextual engagement decision engine 120 in FIG. 3 were to be used, then this aforementioned pre-filter step 310 occurs before step or block 510 described below.

Machine learning-based contextual engagement decision engine process 500 may further include, at block 510, wherein dynamic statistical models may be iteratively re-baselined and/or weighted at periodic intervals to further optimize the output interaction. In some embodiments, such dynamic statistical models 206 may further comprise a plurality of first devices 206*a-f* wherein each of the plurality of first devices 206*a-f* comprises a dynamic statistical model. In some embodiments, such dynamic statistical models 306 further comprise a plurality of first devices 306*a-f* wherein each of the plurality of first devices 306*a-f* comprises a dynamic statistical model that may be used accordingly.

Figure 6:
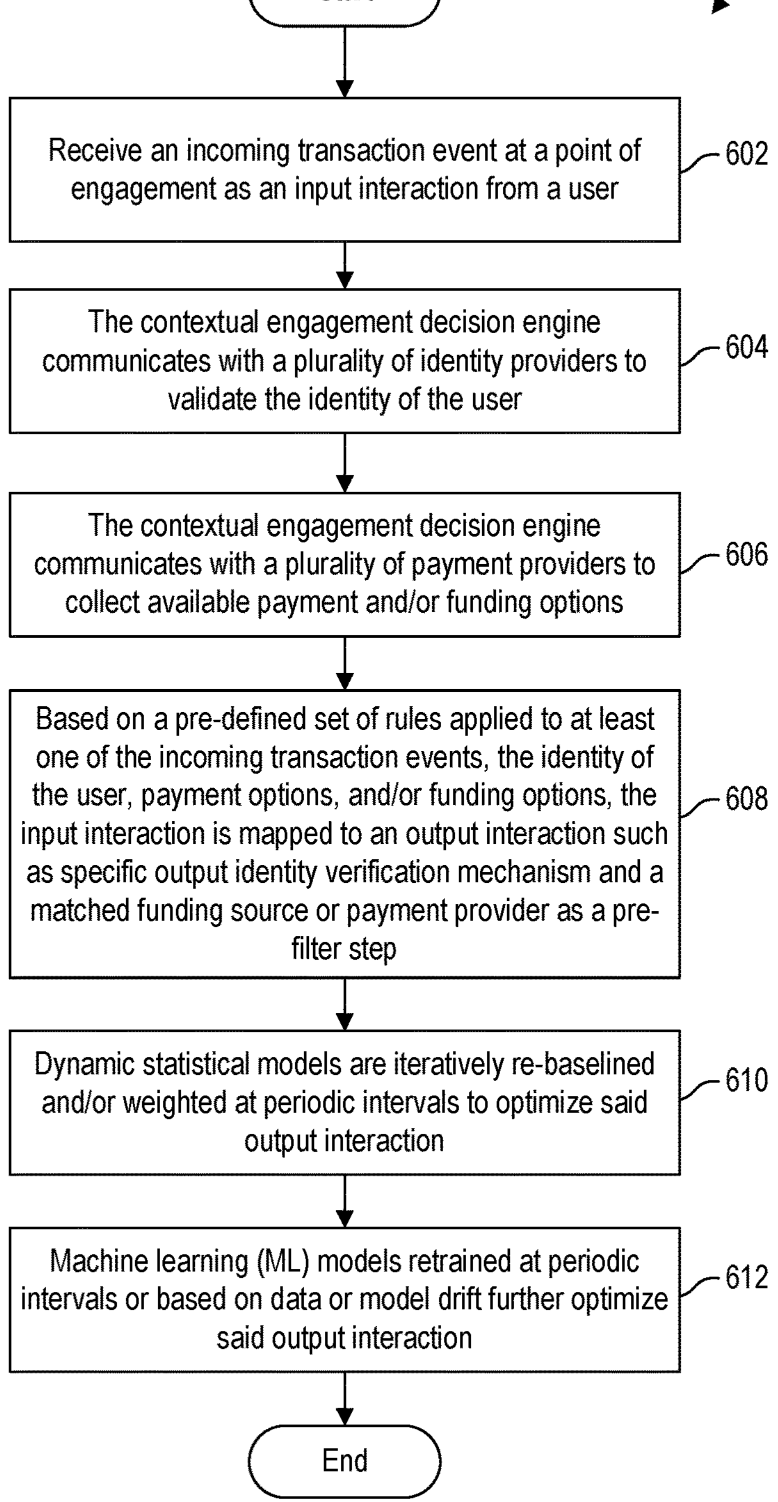
FIG. 6 illustrates a flowchart of an exemplary machine learning-based contextual engagement decision engine process including the use of dynamic statistical models and machine learning models, consistent with disclosed embodiments.

As noted above, the incoming input interaction and/or input data may be received from a user(s), customer(s), and/or merchant(s) via any of the components of system 100. Thereafter, this input interaction may be inputted, analyzed, honed, and/or optimized by the contextual engagement decision engine 120 of the identity and payment orchestration engine 118 to output a certain output interaction to the user(s), customer(s), and/or merchant(s) via any of the components of system 100. FIG. 6 is a flowchart of such an exemplary machine learning-based contextual engagement decision engine process 600, consistent with disclosed embodiments.

The machine learning-based contextual engagement decision engine process 600 may be implemented by one or more computer systems having at least one processor and at least one memory. In some embodiments, the machine learning-based contextual engagement decision engine process 600 may be implemented on a device. In some embodiments, the machine learning-based contextual engagement decision engine process 600 may be implemented by the machine learning-based contextual engagement decision engine system 100. The machine learning-based contextual engagement decision engine process 600 includes, at block 602, receiving an incoming transaction event(s) at a point(s) of engagement as an input interaction from a user(s), customer(s), and/or merchant(s). As mentioned above and seen in FIG. 1, such a transaction at a point(s) of engagement that is considered an input interaction may be a plethora of payment processing transactions including an incoming transaction event in the form of an e-commerce purchase transaction, an incoming purchase from a merchant device 112, and/or an incoming purchase from the customer(s) and/or user(s). Moreover, the point(s) of engagement may also differ and vary. The point(s) of engagement may be made via a consumer device 114 wherein such a consumer device 114 may be a smartphone, tablet, laptop, or desktop computer or via a purchase made by a consumer payment item 116 at a merchant device 112, among other incoming transaction events.

Machine learning-based contextual engagement decision engine process 600 may further include, at block 604, having the contextual engagement decision engine 120 communicate with a plurality of identity providers 104 to validate the identity of the user. In some embodiments, the contextual engagement decision engine 120 may utilize an application programming interface (API) 122 to communicate information and/or data with the identity provider 104. Such data may be freely exchanged between the contextual engagement decision engine 120 and the identity provider 104. Moreover, such data may be continuously honed, analyzed, packaged, and/or modified be either the contextual engagement decision engine 120 and/or the identity provider 104 respectively. Furthermore, such data may include sensitive, confidential, and/or high risk data pertaining to the identities of user(s) and/or individual(s) utilizing the system 100. In still other embodiments, such data may include personal identifiable information (PII) for an individual(s) wherein such personal identifiable information (PII) may include biometric identifiers, facial identifiers, financial information, bank account information, vehicle and/or license information, address information, medical and/or healthcare information, geographic information, phone/fax/mobile information, and other relevant identity information.

Machine learning-based contextual engagement decision engine process 600 may further include, at block 606, having the contextual engagement decision engine 120 communicate with data sources 106, 3$^{rd}$ party data brokers 108, and/or payment providers 110 to collect available payment and/or funding options.

Machine learning-based contextual engagement decision engine process 600 may further include, at block 608, applying a pre-defined set of rules and/or conditions on at least one of the incoming transaction events, the identity of the user, payment options, and/or funding options such that the input interaction is mapped to an output interaction wherein the output interaction may be a specific output identity verification mechanism and a matched funding source or payment provider, as a pre-filter step. To do so, the contextual engagement decision engine 120 communicates with a plurality of payment providers 110, data sources 106, identity providers 104, and/or 3rd party data brokers 108, consumer payment items 116, consumer devices 114, and merchant devices 114 to collect available payment options, funding options, relevant identity information. If the contextual engagement decision engine 120 in FIG. 3 were to be used, then this aforementioned pre-filter step 310 occurs before step or block 610 described below.

Machine learning-based contextual engagement decision engine process 600 may further include, at block 610, wherein dynamic statistical models may be iteratively re-baselined and/or weighted at periodic intervals to further optimize the output interaction. Dynamic statistical models 206 may further comprise a plurality of first devices 206*a-f* wherein each of the plurality of first devices 206*a-f* further comprises a dynamic statistical model or dynamic statistical models wherein each of the plurality of first devices 306*a-f* comprises a dynamic statistical model that may be used accordingly.

Machine learning-based contextual engagement decision engine process 600 may further include, at block 612, wherein Machine Learning (ML) models are retrained at periodic intervals or based on data or model drift to further optimize the output interaction. Machine Learning (ML) models may further comprise a plurality of second devices 208*a-f* wherein each of the plurality of second devices 208*a-f* further comprises a Machine Learning (ML) model or a plurality of second devices 308*a-f* wherein each of the plurality of second devices 308*a-f* further comprises a Machine Learning (ML) model that may be used accordingly. In some embodiments, the machine learning models 208 may be low-complexity logistic regressors, over probabilistic models, higher-dimensional model frameworks such as random forest, extreme gradient boosting, or deep neural network models.

As noted above, the incoming input interaction and/or input data may be received from a user(s), customer(s), and/or merchant(s) via any of the components of system 100. Thereafter, this input interaction may be inputted, analyzed, honed, and/or optimized by the contextual engagement decision engine 120 of the identity and payment orchestration engine 118 to output a certain output interaction to the user(s), customer(s), and/or merchant(s) via any of the components of system 100. FIG. 7 is a flowchart of such an exemplary machine learning-based contextual engagement decision engine process 700, consistent with disclosed embodiments.

As seen in FIG. 7, in block 702, an input interaction is received from a user. As mentioned above, such an input interaction received from a user may be an incoming transaction event(s) at a point(s) of engagement. As mentioned above and seen in FIG. 1, such a transaction at a point(s) of engagement that is considered an input interaction may be a plethora of payment processing transactions including an incoming transaction event in the form of an e-commerce purchase transaction, an incoming purchase from a merchant device 112, and/or an incoming purchase from the customer(s) and/or user(s). Moreover, the point(s) of engagement may also differ and vary. The point(s) of engagement may be made via a consumer device 114 wherein such a consumer device 114 may be a smartphone, tablet, laptop, or desktop computer or via a purchase made by a consumer payment item 116 at a merchant device 112, among other incoming transaction events.

Furthermore, in block 704 of the machine learning-based contextual engagement decision engine process 700, the identity of the user is validated. As seen in FIG. 1, this may be done by the contextual engagement decision engine 120 communicating with a plurality of identity providers 104 to validate the identity of the user. In some embodiments, such a validation of the user may be an identity verification mechanism. In some embodiments, the identity verification mechanism may be a biometric authentication mechanism. In some embodiments, the biometric authentication mechanism may utilize hand palms, fingerprints, and/or eye retinas, amongst other biometrics to authenticate the identity of the user. If the identity of the user is not validated, the process 700 moves to block 706, wherein the payment is rejected and the transaction declined. Declining a transaction at this stage of the process 700 signifies that an illegitimate user may be trying to access the user(s), consumer(s), merchant(s), and/or system(s) data, wherein such data may include sensitive, confidential, and/or high risk data pertaining to the identify of a user(s), consumer(s), merchant(s), and/or system(s) and/or sensitive, confidential, and/or high risk data pertaining to market data, customer data, industry data, demographic data, technographic data, and/or operational data, amongst other types of data. As such, the process 700 will move to alert the user(s), consumer(s), merchant(s), and/or system(s) of such a breach—as seen in block 720 of FIG. 7. If, however, the identity of the user is validated, the process 700 moves on to block 708.

In block 708 of the machine learning-based contextual engagement decision engine process 700, the contextual engagement decision engine 120 communicates with a plurality of payment providers to collect available payment and/or funding options. This may be done in the form of the contextual engagement decision engine 120 communicating with data sources 106, 3rd party data brokers 108, and/or payment providers 110 to collect available payment and/or funding options.

In block 710 of the machine learning-based contextual engagement decision engine process 700, a predefined set of rules are applied. This may be done in the form of applying a pre-defined set of rules and/or conditions on at least one of the incoming transaction events, the identity of the user, payment options, and/or funding options. If the conditions are met, as seen in block 712, the process moves to block 714 and the transaction is approved. In some embodiments, this may mean that the input interaction has passed the pre-defined rules, conditions, and/or threshold such that the appropriate output interaction would be the approval of the transaction. If, however, the input interaction does not pass the aforementioned pre-defined rules, conditions, and/or threshold, then the process 700 moves on to block 716.

In block 716 of the machine learning-based contextual engagement decision engine process 700, dynamic statistical models are applied onto the input interaction to further optimize the output. Such dynamic statistical models 206 may further comprise a plurality of first devices 206*a-f* wherein each of the plurality of first devices 206*a-f* comprises a dynamic statistical model or dynamic statistical models 306 that further comprise a plurality of first devices 306*a-f* wherein each of the plurality of first devices 306*a-f* comprises a dynamic statistical model may be used accordingly.

In block 718 of the machine learning-based contextual engagement decision engine process 700, Machine Learning (ML) models are applied onto the input to further optimize the output. Machine Learning (ML) models may further comprise a plurality of second devices 208*a-f* wherein each of the plurality of second devices 208*a-f* further comprises a Machine Learning (ML) model or a plurality of second devices 308*a-f* wherein each of the plurality of second devices 308*a-f* further comprises a Machine Learning (ML) model that may be used accordingly.

FIG. 8 illustrates an exemplary retail use case for the exemplary machine learning-based contextual engagement decision engine system 800, consistent with disclosed embodiments. As seen in FIG. 8, the machine learning-based contextual engagement decision engine system 800 comprises a consumer device 814 that communicates with all aspects of the system 800 wherein the components of the system may be consumer validation, card payments, biometric check-in, and/or buy now pay later options, amongst others, that are encapsulated in an orchestration layer. In this way, the user(s), consumer(s), and/or merchant(s) may communicate with the components encapsulated in this orchestration layer via a single application programming interface or API 812. In the system 800, an omni-channel retailer may provide the API 812 to consumer(s) and/or user(s) to pay both in-store and online wherein the consumer(s) and/or user(s) may expand payment options and venues.

FIG. 9 illustrates an exemplary sports betting use case for the exemplary machine learning-based contextual engagement decision engine system 900, consistent with disclosed embodiments. As seen in FIG. 9, the machine learning-based contextual engagement decision engine system 900 comprises a consumer device 914 that communicates with all aspects of the system 900 wherein the components of the system may be biometric enrollment, Know Your Customer data, Loyalty provider data, and/or crypto funding, amongst others, that are encapsulated in an orchestration layer. In this way, the user(s), consumer(s), and/or merchant(s) may communicate with the components encapsulated in this orchestration layer via a single application programming interface or API 912. In the system 900, an online betting platform may be developed that needs to comply with regulations pertaining to enhanced identification requirements. Additionally, such an online betting platform may provide for a loyalty program and the use of crypto funding for the user(s), customer(s), and/or merchant(s). All such services may be provided by having the user(s), customer(s), and/or merchant(s) access the aforementioned encapsulated components of the system 900 via the consumer device 914.

FIG. 10 illustrates a block diagram of an exemplary machine learning-based contextual engagement decision engine system 1100, consistent with disclosed embodiments. The components and devices in FIG. 10's machine learning-based contextual engagement decision engine system 1100 have similar components and devices as in FIG. 1's machine learning-based contextual engagement decision engine system 100; therefore, not all the details of the components and devices of system 1100 will be repeated here. Moreover, FIG. 10 outlines FIG. 7's exemplary machine learning-based contextual engagement decision engine process 700. The details of process 700 may be further seen in FIG. 10; therefore, not all the details of process 700 will be repeated here.

In some embodiments, the transaction event origin 1120 may be implemented as one or more computer systems having at least one processor and at least one memory. In some embodiments, the transaction event origin 1120 may be implemented on a device. In some embodiments, the transaction event origin 1120 may be any device(s) used to conduct transaction(s) for a user(s), consumer(s), merchant(s), computer system(s), and/or automated system(s). Such transaction(s) may include financial transactions, identity verification transactions, operational transactions, and/or inventory transactions, among others. In some embodiments, as can be seen in FIG. 10, the transaction event origin 1120 may interact with any one of the aforementioned component(s) and/or device(s) of FIG. 1, which may include a consumer device 114, a consumer payment item 116, and/or a merchant device 112. In some embodiments, such an interaction may include the exchange, processing, harvesting, and/or collecting of data between each of the above-mentioned component(s) with the transaction event origin 1120. In other embodiments, an application program interface 122 may be utilized to conduct such an interaction(s) and/or transaction(s), as need be.

In some embodiments, the contextual engagement decision engine 120 may be implemented as one or more computer systems having at least one processor and at least one memory. In some embodiments, the contextual engagement decision engine 120 may be implemented as a device. In some embodiments, the contextual engagement decision engine 120 may be any device(s) used to conduct transaction(s) for a user(s), consumer(s), merchant(s), computer system(s), and/or automated system(s). Such transaction(s) may include financial transactions, identity verification transactions, operational transactions, and/or inventory transactions, among others.

In some embodiments, as can be seen in FIG. 10, the contextual engagement decision engine 120 may interact with any one of the aforementioned component(s) and/or device(s) of FIG. 1, which may include identity providers 104, data sources 106, 3$^{rd}$ party data brokers 108, and/or payment providers 110. In some embodiments, such an interaction may include the exchange, processing, harvesting, and/or collecting of data between each of the above-mentioned component(s) with the contextual engagement decision engine 120. In some embodiments, such data may include sensitive, confidential, and/or high risk data. In still other embodiments, such data may include sensitive, confidential, and/or high risk data pertaining to the identities of user(s) and/or individual(s) utilizing the system 1100. In still other embodiments, such data may include personal identifiable information (PII) for an individual(s) wherein such personal identifiable information (PII) may include biometric identifiers, facial identifiers, financial information, bank account information, vehicle and/or license information, address information, medical and/or healthcare information, geographic information, phone/fax/mobile information, and other relevant identity information.

In other embodiments, an application program interface 122 may be utilized to conduct such an interaction(s) and/or transaction(s), as need be. In other embodiments, various APIs 122 may be utilized to ensure this facile communication between the contextual engagement decision engine 120 and all other components of the system 1100 in such a manner as to ensure an optimized payment process for the user(s), consumer(s), and/or merchant(s).

When implementing FIG. 7's exemplary machine learning-based contextual engagement decision engine process 700 onto FIG. 10's machine learning-based contextual engagement decision engine system 1100, an e-commerce purchasing transaction, for example, may be received by the transaction event origin 1120 from the consumer via an API 122. If the identity verification is successful, then the process moves forward. Otherwise, the payment is rejected and the transaction declined. Thereafter, the data moves on to the contextual engagement decision engine 120 and its aforementioned three-pronged elements of a predefined set of rules, dynamic statistical models, and Machine Learning (ML) models. Such a contextual engagement decision engine 120 interacts with and receives data from the aforementioned components of system 100, such as identity providers 104, data sources 106, 3$^{rd}$ party data brokers 108, and/or payment providers 110, as seen in both FIG. 10 and FIG. 1. In some embodiments, as seen in FIG. 10, the API 122 provides this interaction and/or communication. Thereafter, the appropriate output interaction is outputted to the user(s), consumer(s), and/or merchant(s). In some embodiments, as seen in FIG. 10, the API 122 outputs the appropriate output interaction to the user(s), consumer(s), and/or merchant(s).

It will be apparent to persons skilled in the art that various modifications and variations can be made to the disclosed structure. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A contextual engagement decision engine system comprising:

a plurality of first devices each comprising a dynamic statistical risk model;

a plurality of second devices each comprising a machine learning model, each machine learning model comprising an architecture that further comprises a preprocessing stage and a feature engineering stage, and wherein each machine learning model is configured to be continuously trained using historical and live user transactions;

a memory storing instructions; and a processor configured to execute the instructions to perform operations comprising:

defining a set of rules comprising a collection of conditions for mapping an input interaction to an output interaction;

receiving, from a point of engagement the input interaction from a user, the point of engagement being a consumer device or a consumer payment item device;

communicating with a plurality of identity providers via an orchestration layer to obtain personal identifiable information from the plurality of identity providers, wherein the orchestration layer provides a single point of entry for communication with the plurality of identity providers;

validating an identity of the user based on the obtained personal identifiable information;

communicating with a plurality of payment providers via the orchestration layer to collect available payment or funding options based on the validated identity of the user, wherein the orchestration layer provides the single point of entry for communication with the plurality of payment providers;

mapping the input interaction to the output interaction using the predefined set of rules, wherein the mapping is based on the validated identity of the user and the collected available payment or funding options, and wherein the output interaction is an identity verification outcome or a payment route;

causing the plurality of first devices to optimize the output interaction using the plurality of dynamic statistical risk models;

causing the plurality of second devices to further optimize the optimized output interaction using the plurality of machine learning models; and performing a transaction that reflects the further optimized output interaction.

2. The system according to claim 1, wherein the input interaction is an incoming transaction event at the point of engagement.

3. The system according to claim 1, wherein the output interaction further includes an identity verification mechanism, a matched funding source, or a payment provider.

4. The system according to claim 1, wherein the dynamic statistical risk model iteratively re-baselines or weighs the output interaction at periodic intervals.

5. The system of claim 1, wherein the dynamic statistical risk model comprises a logistic regression-based architecture or a tree-based architecture.

6. The system of claim 1, wherein the processor is further configured to:

retrain each of the machine learning models based on live interaction data; or retrain each of the machine learning models at periodic intervals.

7. A method of processing a transaction at a point of engagement using a contextual engagement decision engine, the method comprising:

defining a set of rules using the contextual engagement decision engine, the set of rules comprising a collection of conditions for mapping an input interaction to an output interaction, and wherein the contextual engagement decision engine comprises:

the set of rules;

a plurality of first devices each comprising a dynamic statistical risk model; and a plurality of second devices each comprising a machine learning model, each machine learning model comprising an architecture that further comprises a preprocessing stage and a feature engineering stage;

receiving the input interaction from a user at the point of engagement, the point of engagement being a consumer device or a consumer payment item device;

communicating with a plurality of identity providers using the contextual engagement decision engine and via an orchestration layer to obtain personal identifiable information from the plurality of identity providers, wherein the orchestration layer provides a single point of entry for communication with the plurality of identity providers;

validating an identity of the user using the contextual engagement decision engine and based on the obtained personal identifiable information;

communicating with a plurality of payment providers using the contextual engagement decision engine and via the orchestration layer to collect available payment or funding options based on the validated identity of the user, wherein the orchestration layer provides the single point of entry for communication with the plurality of payment providers;

mapping the input interaction to the output interaction using the contextual engagement decision engine and based on the predefined set of rules, wherein the mapping is based on the validated identity of the user and the collected available payment or funding options, and wherein the output interaction is an identity verification outcome or a payment route;

optimizing the output interaction using the plurality of first devices;

further optimizing the optimized output interaction using the plurality of second devices, wherein each machine learning model is configured to be continuously trained using historical and live user transactions; and performing a transaction at the point of engagement that reflects the further optimized output interaction.

8. The method of claim 7, wherein the input interaction is the incoming transaction event at the point of engagement.

9. The method of claim 7, wherein the output interaction further includes an identity verification mechanism, a matched funding source, or a payment provider.

10. The method of claim 7, further comprising iteratively re-baselining or weighing each of the dynamic statistical risk models at periodic intervals.

11. The method of claim 7, further comprising utilizing a logistic regression-based architecture or a tree-based architecture for each of the dynamic statistical risk models.

12. The method of claim 7, further comprising at least one of:

retraining at least one of the machine learning models based on live interaction data to further optimize the output interaction; or retraining the machine learning models at periodic intervals.

13. A non-transitory computer-readable medium comprising instructions that when executed by at least one processor cause the at least one processor to perform a method comprising:

defining a set of rules using a contextual engagement decision engine, the set of rules comprising a collection of conditions for mapping an input interaction to an output interaction, and wherein the contextual engagement decision engine comprises:

the set of rules;

a plurality of first devices each comprising a dynamic statistical risk model; and a plurality of second devices each comprising a machine learning model, each machine learning model comprising an architecture that further comprises a preprocessing stage and a feature engineering stage;

receiving the input interaction from a user at the point of engagement, the point of engagement being a consumer device or a consumer payment item device;

communicating with a plurality of identity providers using the contextual engagement decision engine and via an orchestration layer to obtain personal identifiable information from the plurality of identity providers, wherein the orchestration layer provides a single point of entry for communication with the plurality of identity providers;

validating an identity of the user using the contextual engagement decision engine and based on the obtained personal identifiable information;

communicating with a plurality of payment providers using the contextual engagement decision engine and via the orchestration layer to collect available payment or funding options based on the validated identity of the user, wherein the orchestration layer provides the single point of entry for communication with the plurality of payment providers;

mapping the input interaction to the output interaction using the contextual engagement decision engine and based on the predefined set of rules, wherein the mapping is based on the validated identity of the user and the collected available payment or funding options, and wherein the output interaction is an identity verification outcome or a payment route;

optimizing the output interaction using a plurality of first devices;

further optimizing the optimized output interaction using a plurality of second devices, wherein each machine learning model is configured to be continuously trained using historical and live user transactions; and performing a transaction at the point of engagement that reflects the further optimized output interaction.

* * * * *